US008713520B2

(12) United States Patent
Bank et al.

(10) Patent No.: US 8,713,520 B2
(45) Date of Patent: Apr. 29, 2014

(54) WEB DEVELOPMENT ENVIRONMENT THAT ENABLES A DEVELOPER TO INTERACT WITH RUN-TIME OUTPUT PRESENTATION OF A PAGE

(75) Inventors: Christopher Bank, Irvine, CA (US); James W. Doubek, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1093 days.

(21) Appl. No.: 12/098,295

(22) Filed: Apr. 4, 2008

(65) Prior Publication Data
US 2014/0026115 A1   Jan. 23, 2014

(51) Int. Cl.
G06F 9/44 (2006.01)
G06F 17/00 (2006.01)

(52) U.S. Cl.
USPC .......................... 717/111; 717/113; 715/234

(58) Field of Classification Search
USPC .................................... 717/111, 113
See application file for complete search history.

(56) References Cited

U.S. PATENT DOCUMENTS

| 6,182,122 B1 | 1/2001 | Berstis |
| 6,247,020 B1 | 6/2001 | Minard |
| 6,297,819 B1 * | 10/2001 | Furst ............................ 715/733 |
| 7,316,003 B1 * | 1/2008 | Dulepet et al. ................ 717/111 |
| 7,373,594 B1 | 5/2008 | Lopez et al. |
| 7,448,024 B2 * | 11/2008 | Breeden et al. ............... 717/125 |
| 7,480,897 B2 * | 1/2009 | Reinhardt et al. ............. 717/120 |
| 7,536,641 B2 * | 5/2009 | Rosenstein et al. ........... 715/234 |
| 7,730,083 B2 | 6/2010 | Almeida |
| 2003/0023641 A1 | 1/2003 | Gorman et al. |
| 2004/0268231 A1 | 12/2004 | Tunning |
| 2005/0120292 A1 | 6/2005 | Suzuki |
| 2005/0229154 A1 | 10/2005 | Hiew et al. |
| 2006/0026503 A1 | 2/2006 | Bartosh et al. |
| 2006/0064676 A1 | 3/2006 | Chavan |
| 2006/0129926 A1 | 6/2006 | Malek et al. |
| 2006/0200751 A1 | 9/2006 | Underwood et al. |
| 2006/0212843 A1 | 9/2006 | Zaky et al. |
| 2006/0253508 A1 | 11/2006 | Colton et al. |
| 2008/0016488 A1 | 1/2008 | Adams et al. |
| 2008/0141118 A1 | 6/2008 | Arkhipov et al. |

OTHER PUBLICATIONS

Aoki et al., "A Web Site Editing System based on Unfold/Fold Operations," 2002, 8pg.*
"Getting to Know FrontPage," 2003, 34pg.*

(Continued)

*Primary Examiner* — Ryan Coyer
(74) *Attorney, Agent, or Firm* — Kilpatrick Townsend & Stockton LLP

(57) ABSTRACT

A web page authoring tool is provided enables a developer to interact with run-time output presentation of a page being authored. The web page authoring tool includes an embedded browser that supports a "live preview mode" that enables a run-time page to be viewed. Thus, the live preview mode presents an operational run-time output presentation that is generated by browser source code (rather than original source code), just as would be presented by a client-side browser, and which may present a code view of the run-time browser source code that generates such run-time output presentation. Further, the run-time output presentation view provided by the web page authoring tool remains interoperable with certain authoring support functions of the web page authoring tool, such as enabling a developer to easily access corresponding original source code for selected portions of a run-time page view.

30 Claims, 13 Drawing Sheets

(56) References Cited

OTHER PUBLICATIONS

Murray et al., "Creating a Web Pate and Web Site Using Microsoft FrontPage 2003 for Windows 2000/Me/XP," Oct. 2003, 59pg.*
Wendelin et al., "10 Things you didn't know about Firebug," 2007, 2pg. (last accessed Dec. 19, 2011).*
U.S. Appl. No. 12/049,192, filed Mar. 14, 2008.
U.S. Appl. No. 12/098,304, filed Apr. 4, 2008.
www.barebones.com/poducts/bbedit/featuresweb.shtml. pp. 1-3, Apr. 3, 2008.
www.panic.com/coda/, pp. 1-15, Apr. 3, 2008.
www.ultraedit.com/index.php?name=UE_HTMLFeatures, pp. 1-3, Apr. 4, 2008.
www.getfirebug.com/, pp. 1-5, Apr. 3, 2008.
Non Final Office Action in related U.S. Appl. No. 12/049,192 dated Nov. 22, 2011.
Non Final Office Action in related U.S. Appl. No. 12/098,304 dated Dec. 8, 2011.
Final Office Action in related U.S. Appl. No. 12/049,192 dated Aug. 30, 2012, 32 pages.
Giulio Zambon with Michael Sekler, Beginning JSP, JSF, and Tomcat Web Development, Apress, 2007, pp. 2-5.
Geoff Blake, Tenton Dreamweaver, Peachpit Press, Feb. 13, 2006, p. 302 (2 pages).
Cheryl D. Wise, Foundations of Microsoft Expression Web, The Basics and Beyond, Apress, May 7, 2007, pp. 1-23.
Zak Ruvalcaba, Macromedia Dreamwaver 8 Unleashed, Managing Website Content Using Contribute, Chapter 13, Sams, ISBN: 0-672-32760-0, Oct. 7, 2005, pp. 424-430.
Zak Ruvalcaba, Adobe Dreamweaver CS3 Unleashed, Chapters 1, 18 and 19, Sams, ISBN: 0-672-32944-9, Oct. 18, 2007, pp. 3-7 (Ch. 1), pp. 639-655 (Ch. 18), pp. 670-679 (Ch. 19).
Final Office Action in related U.S. Appl. No. 12/049,192, dated Feb. 5, 2013, 48 pages.

* cited by examiner

WEB DEVELOPMENT ENVIRONMENT THAT ENABLES A DEVELOPER TO INTERACT WITH RUN-TIME OUTPUT PRESENTATION OF A PAGE

CROSS-REFERENCE TO RELATED APPLICATIONS

This application is related to co-pending U.S. patent application Ser. No. 12/049,192 filed Mar. 14, 2008, and to U.S. patent application Ser. No. 12/098,304 filed on Apr. 4, 2008, now U.S. Pat. No. 8,356,277, the contents of which are hereby incorporated herein by reference in their entirety.

TECHNICAL FIELD

The following description relates generally to software code authoring tools, and more specifically to a web development tool that provides a user interface that enables a user to interact with run-time output presentation generated for a web page. In certain embodiments, the web development tool provides a live preview mode that employs an embedded browser to present an operational run-time output presentation, just as would be presented by a client-side browser, and which presents a code view of the run-time source code that is used by the browser to generate such operational run-time output presentation. In certain embodiments, the web development tool enables dynamic code, such as JavaScript code, to be paused/frozen, thereby enabling the developer to view/edit the run-time source code in a given state of the output presentation page. Further, in certain embodiments, the web development tool provides a code navigation interface that aids the developer in accessing corresponding portions of code in an original source file(s) responsive to user selection of run-time output presentation or browser code.

BACKGROUND

Many software development tools are available today for use by software designers (or "developers") in creating various types of software applications. Software "designers" and "developers" are used interchangeably herein, and generally refer to anyone involved with using a software development tool (or "authoring tool") for authoring a software application. Authoring may include coding, designing, and/or otherwise creating or modifying the software application. A software application, as used herein, generally refers to any application that may be executed by a processor (or interpreter of some type) in order to perform operations defined by the instructions of the software application, including as an example presenting a user interface to a display. One example of such a software application is a web page, which may be defined in a markup language, such as HTML, XML, etc., JavaScript, and/or other underlying page source code that may be read and interpreted by a browser to generate a corresponding output presentation of the web page to a display.

In a software development environment, a developer may interact with a software development tool for writing code, compiling the code, testing or debugging the code, and packaging the resulting application for deployment in a run-time environment. The software development tool may be implemented as a software application that is stored to a computer-readable medium and executed by a computer processor to perform the tasks associated with aiding a developer in the development of a software application. As one example, an integrated development environment (IDE) is commonly used for developing software applications. In general, an IDE is a programming environment that has been packaged as a software application program, typically including a code editor, a compiler, a debugger, and a graphical user interface (GUI) builder. The IDE may be a stand-alone application or may be included as part of one or more existing and compatible applications. IDEs provide a user-friendly framework for many modem programming languages, such as Visual Basic, Java, and PowerBuilder. IDEs for developing markup language (e.g., HTML, XML, etc.) applications are among the most commonly used.

Thus, IDEs provide software authoring tools that allow a developer (e.g., a web developer) to create web pages, websites, interactive applications, and the like for use by end users (e.g., visitors to websites). Various IDEs exist in the current marketplace, such as DREAMWEAVER®, available from Adobe Systems Incorporated, and FRONTPAGE®, available from Microsoft Corporation. DREAMWEAVER is one example of a web authoring tool that allows web developers to design Hypertext Markup Language (HTML) web pages in both a code editor and a graphical-based design time environment. DREAMWEAVER also allows the developer to design in other markup languages, such as, for example, Extensible Markup Language (XML), Extensible HTML (XHTML), Active Server Page (ASP), COLDFUSION™ Markup Language (CFML™), and the like.

Many software application authoring tools, as may be provided by an IDE, are available today for use by software developers in creating various types of software applications, such as web pages and/or websites, including as examples such software code authoring tools as ADOBE® DREAMWEAVER® and MICROSOFT® FRONTPAGE®. Certain authoring tools, such as ADOBE® DREAMWEAVER®, allow a developer to create a document in an environment that includes both a text-based code view and a graphical-based design view. The code view renders the source code (e.g., markup language code, scripting language code, stylesheet code, etc.) as text in a portion of the screen and allows the developer to see and manipulate the source code in the document file. For example, the developer may write and edit HTML or Cascading Style Sheets (CSS) code in the code view.

The design view (or "display view"), on the other hand, is a What You See Is What You Get (WYSIWYG) view of the output presentation document (e.g., web page) that is to be generated by an interpreter (e.g., a browser) as a result of interpreting one or more of the source files (e.g., html file, CSS file, etc.), and thus the design view allows the user to visually manipulate the interpreted and graphically laid-out version of the output presentation document, such as, for example, by dragging, dropping, cutting, and pasting visual components. As discussed further herein, the design view may employ techniques similar to those employed by browsers for presenting a mimicked output presentation document, which may be similar but is quite often not identical to an actual output presentation document that will be rendered by a browser at run-time. The design view provides an editable view of the output presentation document, rather than a run-time view of such output presentation document, wherein the developer may manipulate such output presentation within the design view. As the developer works, changes to the document are reflected in both the code view and the design view.

Once a designer creates source code (which may be referred to as a "source page" or "source file"), such source code is typically stored to a web server that is accessible by clients via a communication network, such as the Internet. The clients may access the web server and download the source code, which a browser executing on the client's computer interprets to generate a corresponding run-time output presentation, as is well known in the art.

Many software applications, such as web pages, comprise a plurality of source files that may be used by an interpreter (e.g., a browser) to build a resulting run-time output presentation. For instance, many web pages comprise a main file with one or more related files. A "related file," as used herein, refers generally to a file required to build another document, such as an output presentation document. In some software development tools, such as DREAMWEAVER, these related files may be referred to as "dependent" files. For instance, a main file may be created that references one or more related files that must also be accessed/interpreted in order to generate a presentation output document. As an example, a main web page document (e.g., main HTML document) may be created that references other related files that are used to generate at least a portion of the presentation output that is to be presented by a client's browser for the web page. For instance, a main web page document may reference such related files as images, external style sheets, scripting language files (e.g., JavaScript files, etc.), and/or other files that a browser loads when it loads the web page. The browser may use the various related files to construct the run-time output presentation document that is presented to the client.

As one example, style sheets, such as cascading style sheet ("CSS"), are commonly employed to help readers of web pages (e.g., browsers) to define visual layout of a web page's content, such as colors, fonts, layout, and other aspects of document presentation. In this manner, the style sheet may be designed primarily to enable the separation of document content (written in HTML or a similar markup language, e.g., in a main file) from document presentation (written in CSS). Thus, the main HTML file for a web page may be authored to define certain content and/or reference one or more other related files that provide certain content (e.g., image files) that is desired to be presented in a run-time output presentation document that is to be generated when the web page is interpreted by an interpreter program (such as a client browser), and the main HTML file may reference one or more style sheets that define the visual layout of such content that is desired to be generated within the run-time output presentation document. Such use of style sheets are well known in the art.

As another example, scripting language files, such as JavaScript (JS) files, are commonly employed to provide functions that may be executed during run-time of a web page by a browser to further define the visual presentation and/or actions of the run-time output presentation document presented by the browser. Thus, a main web page document (e.g., main HTML document) may reference one or more scripting language files that are invoked for imparting certain functionality for the run-time output presentation document presented by the browser. Such use of scripting language files are also well known in the art.

Web authors generally create and edit web pages that comprise a main file (e.g., a main HTML file) with many related files, such as external JS, CSS, XML, and/or other server-side files, such as other HTML files, ColdFusion Markup Language (CFML) files, PHP files, or active server pages (ASP) files. This is the common way to construct web pages to allow sharing and re-use of components, and the authored web pages can thus become fairly complex.

Thus, when authoring a web page (or website comprising a collection of web pages), a developer often desires to author/edit not only a main file, but also the various related files to arrive at source files that when interpreted by a browser result in a desired run-time output presentation document being generated.

As mentioned above, some software development environments, such as DREAMWEAVER, provide not only a code view interface, but also provide a design view interface. Traditional design view interfaces present a mimicked view of the output presentation document (e.g., web page) that is to be generated by an interpreter (e.g., a browser) as a result of interpreting one or more of the source files (e.g., html file, CSS file, etc.). Such a mimicked view may be similar, but is quite often not identical, to an actual output presentation document that will be rendered by a browser at run-time.

One reason why the design view may not present an identical output presentation document as that which is generated at run-time by a browser is because of changes that occur along various points of delivery of the page. That is, the source files may change at various points along delivery of the source files from a hosting server (e.g., web server) to the point of actual run-time output presentation by a browser. For instance, source files that are authored and uploaded to a hosting server may thereafter be modified (e.g., by other files) on the server side before delivery to a requesting client. For instance, one or more of the source files that are authored and uploaded to a hosting server may be modified at the server by PHP, ColdFusion Markup Language (CFML), or active server pages (ASP) files.

Additionally, after the source files are delivered to a requesting client, further modifications may occur to those files at the client, prior to generating the output presentation document. As an example, certain information may be populated into a page from a file, database, search engine, etc. For instance, a given output presentation page may display a list of hyperlinks to pages that are found on the Web by a search engine in response to a user's search query, wherein the actual list of items that are displayed are supplied during run-time of the page by another source (e.g., a search engine). As another example, information regarding products in a company's inventory, corresponding product prices, and other product information may be dynamically loaded to a run-time output presentation page from a database.

Further still, additional changes may occur dynamically during run-time presentation of the output presentation document at the client side based, for instance, on a user's actions, web page or browser states, etc. For instance, on-load handling for non-intrusive JavaScript may be performed to modify the source file(s). Also, external JavaScript, AJAX (Asynchronous JavaScript and XML), and/or other scripting language source files may dynamically modify the output presentation document as events occur. Additionally, a stylesheet, such as CSS, may modify the source file(s) being interpreted by the browser for generating the output presentation document, and certain characteristics such as "hover" etc. may modify the source files based, at least in part, on a current state of the page and/or browser.

Accordingly, there are generally three main stages of source code (or source files) in web development. There is the "original" source that resides on the web server and is what a developer edits when the developer wants to make changes to a web page. There is the "delivered" source that is sent from the server to the browser. This is generally what is seen when the "View Source" is clicked in a client browser. This delivered source will also include any processing done by the server from the original source, especially for pages like PHP, ASP, CFML, etc. Lastly, there is the actual browser source, which is the source that represents the run-time output presentation page presented by the browser to a user at any specific time during run-time. This browser source thus includes any browser-side processing through code, such as JavaScript. This browser source can change as a user interacts with the page for performing such actions as menu selections, rollovers, search queries, etc.

Thus, as used herein, an "original" source file refers generally to a source file (e.g., html file, etc.) as it exists when uploaded to a hosting server, before modifications are made to the source file at a client to which it is downloaded. Further, a "delivered" source file refers to the source file as it exists when downloaded to a requesting client. The "delivered" source file may be the same as the "original" source file in some instances, or it may differ from the "original" source file as a result of certain modifications made to the original source file at the server (e.g., through certain server-side processing, particularly for pages like PHP, ASP, CFML, etc.). On the other hand, a "browser source" file refers generally to the source file as it exists after being modified at a client. In other words, the "browser source" file refers to the source file, as modified by JavaScript, etc. at the client, which is actually being read/interpreted by a client browser for generating a run-time output presentation page. Such browser source file may, in some implementations, change from time to time, such as in response to different user actions (e.g., different user queries that are submitted to the page, etc.).

Generally, a traditional design view provided in a software development environment provides a mimicked output presentation view that is derived based on either original source files that are uploaded to a hosting server (prior to any modifications made, such as by PHP, etc., at the server) or based on the delivered source files that are downloaded from a server to a requesting client (prior to any modifications that occur at the client). Thus, the traditional design view may fail to accurately present a true representation of what the run-time output presentation document will be when generated by a browser (e.g., as result of processing a browser source file that is modified at the client). In some instances, the design view may present certain "placeholders" in its output presentation for information that is to be supplied at a later time (e.g., after the source files are loaded to the client), such as a placeholder for information that will be populated from a database, search engine, or other data source in response to a user's entered query.

Additionally, the mimicked view provided by the traditional design view provides an editing preview, rather than a run-time operational view of the output presentation document. For example, if a user clicks on a button presented in the mimicked output presentation document in the design view, the user may be allowed to edit the button, rather than activating the operational functionality of the button as when it is clicked in run-time.

In view of the above, web developers often utilize an external browser application (e.g., separate from the interfaces provided by the web development tool) to analyze the run-time characteristics of an output presentation document that is generated as a result of browser source files. For instance, once the developer authors original source files and uploads them to the hosting server, the developer may use an external browser application, such as Internet Explorer, to access the source files served by the hosting server, and thus analyze/test the resulting output presentation document that is generated by the browser, as a result of the modified browser source files.

Then, if the user desires to make edits to the original source files that are served by the hosting server, the user must return to the development environment and try to locate the code in the corresponding original source file that is to be changed to effect the desired edit to the generated run-time output presentation document. The appropriate changes to make in the original source files in order to effect the desired changes in the run-time output presentation document may be difficult to recognize/understand by the developer, particularly since in the web development environment the developer is generally not viewing or editing the source files as they exist at the time that the browser is generating the run-time output presentation document. Rather, as mentioned above, the developer is often viewing and editing the original source files in the state at which they have when uploaded to the hosting server (or the delivered source files in the state at which they were served to the requesting client), rather than the browser source files as modified by the client.

Certain client-side testing environment tools are known in the art, such as FireBug™. Some of these tools may allow for source code to be viewed at a client site, such as run-time source code being used by a browser for generating a given run-time output presentation document. Further, some of these client-side testing environment tools may enable a user to modify the source code for testing of the resulting browser presentation of a run-time output presentation document. However, any such edits are only effected for the local, client-side document, and do not result in any changes to the server-side source files that are being served by the hosting web server.

In view of the above, a desire exists for an improved software development environment for enabling a developer to more accurately view source code and output presentation as it exists at run-time. For instance, a desire exists for a software development environment for rendering a run-time output presentation document and corresponding run-time source code of source files from which the output presentation document is generated.

SUMMARY

The present invention is directed generally to a web development environment (including a system in which the web development environment resides and a method employed by the web development environment) that enables a developer to interact with run-time output presentation of a page that is under development. As discussed further herein, according to certain embodiments a web page authoring tool provides a web developer with quick access to an interactive browser view of a run-time page, browser source code of a run-time page, and tools to easily access and edit corresponding original source code.

According to certain embodiments, a web page authoring tool includes an embedded browser that supports a "live preview mode" that enables a run-time page to be viewed. Thus, the run-time output presentation of a page can be viewed within an interface (e.g., a run-time output presentation view) of the web page authoring tool, which presents a view of the page's output just as it would be generated by a client browser. In addition, a run-time code view is provided that enables a developer to view the browser source code during run-time of the page.

The run-time output presentation page presented in the live preview mode of the web authoring tool, according to embodiments, enables a user to interact with the run-time output presentation generated for the web page, and thereby analyze the functional operability of the page. Thus, the web authoring tool provides a live preview mode that employs an embedded browser to present an operational run-time output presentation, just as would be presented by a client-side browser, and which may present a code view of the run-time source code that is used by the browser to generate such operational run-time output presentation. The run-time output presentation view, thus provides a run-time page that is generated by an embedded browser from browser source code, rather than providing a mimicked design view of a page's output presentation that is generated from original source code, as with the traditional design views discussed above.

Further, the run-time output presentation view provided by the web page authoring tool remains interoperable with certain authoring support functions of the web page authoring tool. Thus, rather than merely launching a separate browser application that is then disconnected from the web page authoring tool, the run-time output presentation view provided by the web page authoring tool according to embodiments maintains a certain degree of authoring interactivity with the web page authoring tool, thereby aiding a developer's efficiency. For instance, in certain embodiments, the run-time page views provided in the live preview mode are interoperable with certain authoring features provided by the web page authoring tool, such as the web page authoring tool's design-time code view interface and/or editing tools, etc.

Further, as discussed hereafter, other integration of the run-time page views with authoring support tools of the web page authoring tool involves such operations as being able to pause/freeze the dynamic operation of certain dynamic code, such as JavaScript code, of the run-time page, as well as being able to navigate to corresponding original source code responsive to user selection of a portion of the run-time output presentation or run-time browser source code.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1A:
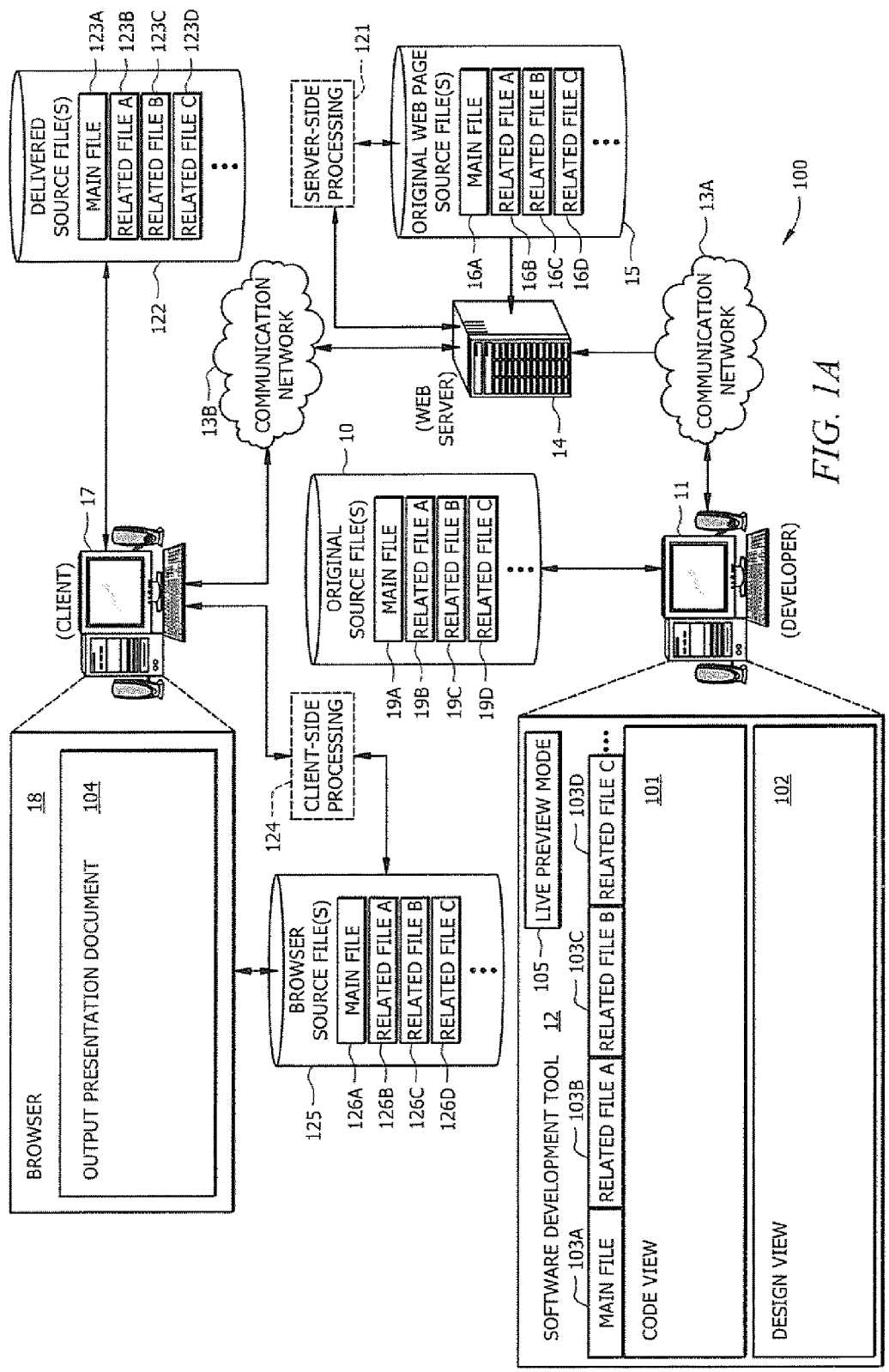
FIGS. 1A-1D show a block diagram of a system illustrating an exemplary web page authoring environment according to an embodiment.

Turning to FIGS. 1A-1D, a block diagram of a system 100 illustrating an exemplary web page authoring environment is shown. As shown, system 100 comprises a first processor-based computer 11, such as a personal computer (PC), laptop computer, server computer, workstation computer, etc. In this example, a software development tool (e.g., web authoring application) 12 is executing on computer 11. Development tool 12 comprises computer-executable software code stored to a computer-readable medium that is readable by a processor of computer 11 and, when executed by such processor, causes computer 11 to perform the various operations described further herein for such development tool 12. Examples of such a software development tool 12 include DREAMWEAVER®, available from Adobe Systems Incorporated, and FRONTPAGE®, available from Microsoft Corporation.

Development tool 12 may enable authoring of software code for web pages (e.g., as is commonly coded using such development tools as those included in DREAMWEAVER® and FRONTPAGE® mentioned above), and may thus be referred to as a web development tool (or "environment"). In many cases, such development tool 12 enables an author (e.g., website designer) to create textual source code that defines a graphical presentation format to be generated by an outputting application (e.g., a web page output by a browser, etc.). Thus, a designer may interact with development tool 12 (via computer 11) to develop a web page for a customer, as discussed further below.

As discussed above, web pages are commonly authored that comprise a main file (e.g., a main HTML file) with many related files, such as external JS, CSS, XML, and/or other server-side files, such as other HTML files, ColdFusion Markup Language (CFML) files, PHP files, or active server pages (ASP) files. Such files may be referred to herein as "source files", as they are used together by an interpreting application, such as a browser, to build/generate an output presentation document.

As discussed above, there are generally three main stages of source code (or source files) in web development. There is the "original" source that resides on the web server and is what a developer edits when the developer wants to make changes to a web page. Thus, in the example illustrated in FIG. 1A, a designer authors (e.g., creates, edits, etc.) original source file(s) 19A-19D for a web page via development tool 12, wherein such original source files 19A-19D for the web page are stored to local data storage 10 of computer 11. Data storage 10 may comprise a hard disk and/or other computer-readable data storage medium that is operable for storing data.

Once authored via software development tool 12, the original source files 19A-19D may be uploaded from computer 11 to web server 14 via a communication network 13A, such as a local area network (LAN), the Internet or other wide area network (WAN), etc. Alternatively, the source file(s) may otherwise be loaded onto web server 14. The uploaded original source files may be stored as uploaded original source files 16A-16D to data storage 15 of web server 14. Data storage 15 may comprise a hard disk and/or other computer-readable data storage medium that is operable for storing data.

While separate locally-stored original source files 19A-19D and uploaded original source files 16A-16D are shown in the example of FIG. 1A, it should be understood that, as is well known in the art, computer 11 and web server 14 may be one in the same, and thus original source files 19A-19D and 16A-16D may likewise be one in the same in certain embodiments. Further, it should be understood that web server 14 may comprise a plurality of clustered or distributed computing devices (e.g., servers) across which the source files may be stored, as is well known in the art.

As discussed further herein, in response to a client request (e.g., from client 17), the web server 14 delivers (or "downloads") source file(s) to the client 17. The delivered source files may be downloaded from web server 14 to client 17 via a communication network 13B, such as a local area network (LAN), the Internet or other wide area network (WAN), etc. The downloaded source files may be stored as "delivered" source files 123A-123D to data storage 122 of client 17. Data storage 122 may comprise a hard disk and/or other computer-readable data storage medium that is operable for storing data. The delivered source files 123A-123D may differ from the original source files 19A-19D that are uploaded to web server 14. For instance, the delivered source files 123A-123D may include modifications made as a result of processing done by the server 14 (e.g., server-side processing 121), especially for pages like PHP, ASP, CFML, etc. Of course, some of the delivered source files may remain the same as a corresponding one of the original source files 16A-16D. For instance, one of the original source files may operate (during server-side processing 121) to modify one or more of the original source files to result in a modified delivered source file(s), but the one original source file that performs such modification may itself remain unmodified.

Finally, the delivered source files 123A-123D may be modified at client 17 to result in browser source files 123A-123D that are stored to data storage 125 of client 17. Data storage 125 may comprise a hard disk and/or other computer-readable data storage medium that is operable for storing data. The browser source files 126A-126D are used by browser 18 to generate the output presentation document 104, and such browser source files 126A-126D may differ from the delivered source files 123A-123D that are downloaded to client 17. For instance, the browser source files 126A-126D may include modifications made as a result of processing done by the client 17 (e.g., client-side processing 124) through code, such as JavaScript. The browser source files 126A-126D can change as a user interacts with the run-time output presentation page 104 for performing such actions as menu selections, rollovers, search queries, etc. Of course, some of the browser source files may remain the same as a corresponding one of the delivered source files 123A-123D. For instance, one of the delivered source files may operate (e.g., in client-side processing 124) to modify one or more of the other delivered source files to result in a modified browser source file(s), but such delivered source file that operates to modify the other delivered source files may itself remain unmodified.

In the illustrated example of FIG. 1A, a main file 19A and various related files 19B-19D are authored, which together provide original source files that are authored for the purpose of being processed by a browser 18 to generate an output presentation document 104. Thus, the related files 19B-19D may comprise any related files, such as external JS, CSS, XML, and/or other server-side files, such as other HTML files, CFML files, PHP files, or ASP files. Further, while 3 related files are shown for illustrative purposes in the example of FIGS. 1A-1D, those of ordinary skill in the art will readily appreciate that any number of such related files may be present in a given web page implementation. Furthermore, as used herein, the "related files" may refer to any files that are used together with the main file for building/generating an output presentation document 104.

In the example of FIGS. 1A-1D, development tool 12 is operable to present one or more user interfaces with which a user (e.g., designer) may interact to author a document, such as the original source files 19A-19D. In this example, development tool 12 presents a code view interface 101 and a design view (or "display view") interface 102. Development tool 12 may employ technology similar to that employed by browsers to read a code document (e.g., of code view 101) and display in design view 102 a corresponding mimicked page that is generated from such original source code. Accordingly, such design view 102 may provide developers the ability to view and edit a web page in a visual mode in which the underlying original source code (e.g., HTML code, XML code, CSS code, etc.) has been rendered, as if on a web browser. While the developer works on the rendered objects, the development tool 12 may translate and effect those changes in the underlying textual code document.

As described above, such a design view 102 typically provides a design-time view of the output presentation of a web page being authored, which mimics a run-time view of the output presentation that would be presented for such web page by a browser. Such a design view 102 is a known interface that is available in certain development tools, such as in DREAMWEAVER®, available from Adobe Systems Incorporated. As discussed above, such a mimicked view of the output presentation page is an editable view, rather than an operational view of the run-time output presentation. Further, the output presentation of such mimicked view may differ from an actual run-time output presentation 104 that is generated by a client-side browser 18 because such mimicked output presentation provided in the design view is generated based on the original source files 19A-19D, rather than being generated based on the browser source files 126A-126D. As discussed above, the browser source files 126A-126D may differ from the original source files 19A-19D (e.g., as a result of server-side processing 121 and/or client-side processing 124), and thus the output presentation in page 104 may likewise differ from the output presentation shown in design view 102.

Code view 101 provides a simple text editor in which the actual textual source code (e.g., HTML code, XML code, CSS code, etc.) contained in the original source files 19A-19D is displayed to the user. Thus, code view 101 shows the textual code of original source files 19A-19D, while design view 102 shows an output presentation page that mimics what would be rendered by a browser when the underlying original source files 19A-19D are read/interpreted (e.g., by a browser). Again, the code view 101 generally shows the code of original source files 19A-19D as they exist when uploaded to a hosting server 14, but typically do not reflect any modifications that are made by other files (such as PHP files, ASP files, etc.) at the server 14 or modifications that are made by other files (such as CSS files, JS files, etc.) after being downloaded to client 17.

Web server 14 is accessible by clients, such as client computer 17, via a communication network 13B, such as the Internet. For instance, a client, such as client computer 17, may access web server 14 and download the delivered source files 123A-123D. As mentioned above, such delivered source files 123A-123D may be processed via client-side processing 124, which may modify those delivered source files (e.g., as a result of JavaScript code, etc.) to result in browser source files 126A-126D, which a browser 18 executing on the client computer 17 interprets to generate a corresponding output presentation document 104. Thus, a run-time output presentation document 104 that is generated as a result of interpreting the web page browser source files 126A-126D can be generated and presented by browser 18 executing on the client computer 17.

According to certain embodiments, software development tool 12 further aids a user in managing presentation of the original source files 19A-19D (i.e., main file 19A and the related files 19B-19D). As described further hereafter, software development tool 12 aids a user in discovering and managing presentation of such source files 19A-19D. For instance, in certain embodiments, software development tool 12 discovers the related files 19B-19D for the main file 19A of an application (e.g., web page) that is being authored. And, as shown in FIG. 1A, software development tool 12 presents a visual indication (e.g., tabs, list, etc.) 103A-103D of the discovered original source files in a user interface. In this way, the user can easily see the related files that exist for the application (e.g., web page) being authored, and the user can readily access any of the related files by interacting with the corresponding visual indication (e.g., clicking a pointing device, such as a mouse, on the visual indication).

In the exemplary embodiment of FIG. 1A, software development tool 12 presents a visual indication of the original source files 19A-19D as tabs (or other visual indicator) 103A-103D, which are displayed in association with the textual source code view 101. And, the user may select any of the original source files 19A-19D for display in the textual source code view 101 by selecting the corresponding visual indicator 103A-103D. Further details regarding such an implementation of presenting visual indicators 103A-103D of source files, which may be employed according to certain embodiments, are provided in co-pending and commonly assigned U.S. patent application Ser. No. 12/049,192 titled "SYSTEMS AND METHOD FOR MANAGING RELATED FILES IN A SOFTWARE DEVELOPMENT ENVIRONMENT" filed Mar. 14, 2008, the disclosure of which is hereby incorporated herein by reference.

Thus, a split view may be presented by software development tool 12 in which the design view 102 and the textual source code view 101 are each simultaneously presented on designated portions of the software development tool's user interface. The design view 102 may remain present on the interface and provide a consistent view of a visual output presentation mimicking the output presentation page that would be generated by a browser as a result of original source files 19A-19D. And, the code view 101 can selectively present the content of any one of the main file 19A and related files 19B-19D in response to a user's selection of the corresponding visual indicator 103A-103D.

Any of the original source files 19A-19D can be edited (e.g., in the code view 101) within software code development tool 12, and then uploaded/saved to data storage 15 of web server 14. Thus, software code development tool 12 provides a server-side authoring tool that enables server-side files to be authored (e.g., created, edited, etc.) and stored at web server 14 for access by clients 17.

In addition, according to certain embodiments, a developer may select to have an interface be presented to present source code and/or output presentation for a run-time output document. For instance, in FIGS. 1A-1D software development tool 12 provides a "live preview mode" button 105, which when activated by a user results in a presentation of a visual layout of a generated run-time output presentation document (e.g., run-time output presentation view 108 of FIG. 1B) and/or a presentation of textual run-time source code present in the browser source files 136A-136D (e.g., run-time code view 107 of FIG. 1B).

Figure 1B:
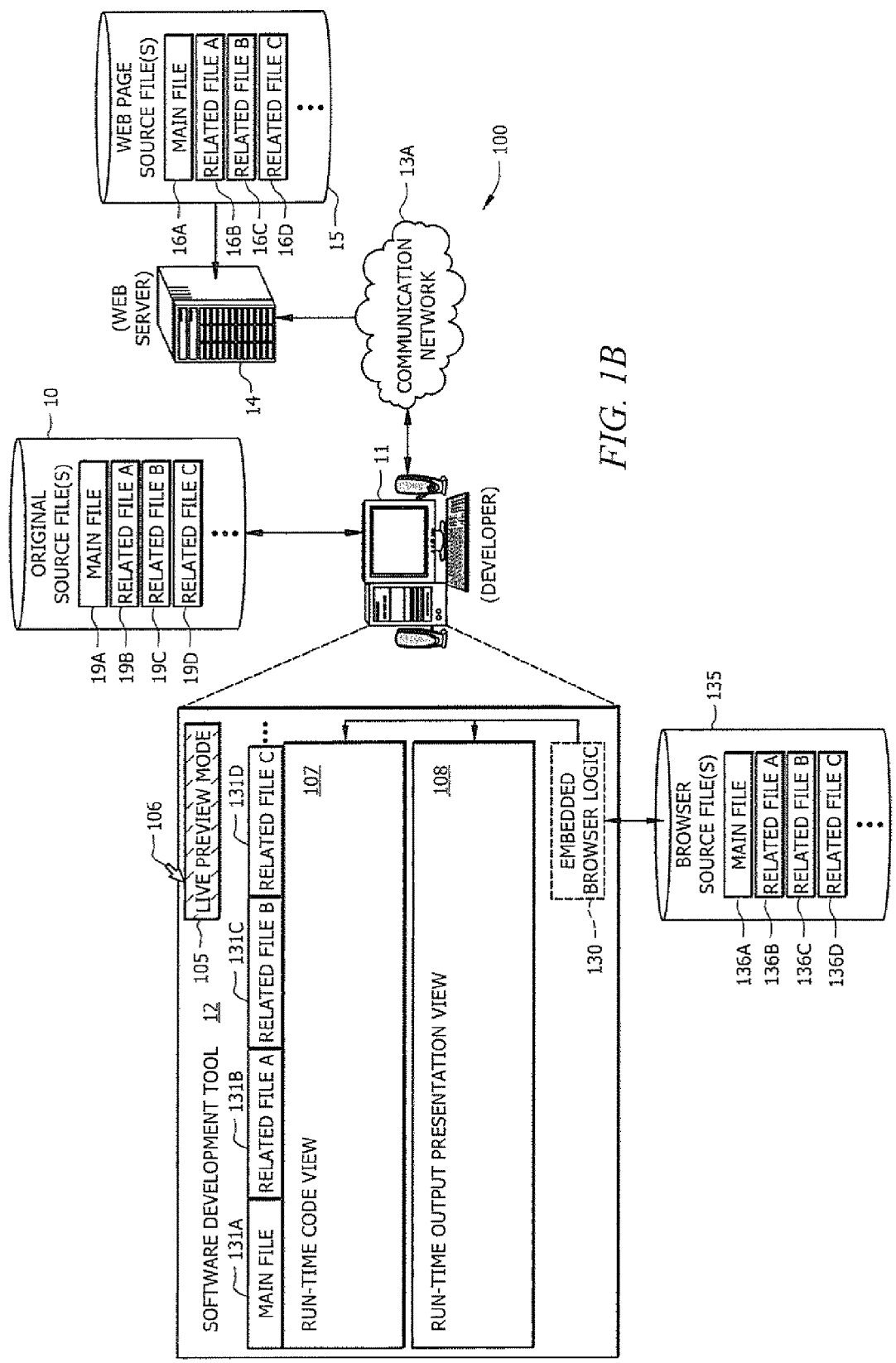

For instance, in the example of FIG. 1B, a user selects live preview mode button 105 (e.g., by positioning cursor 106 over the button 105 and clicking or double-clicking a pointing device, such as a mouse). In response, software development tool 12 generates presentation of a visual layout of a generated run-time output presentation document 104 in the run-time output presentation view 108. For instance, software development tool 12 may effectively employ an integrated browser 130 to generate the run-time output presentation view 108, such that the run-time output presentation view 108 presents the actual run-time output presentation document, such as document 104 presented by client browser 18 (in FIG. 1A).

For instance, in response to the developer selecting live preview mode 105, computer 11 may request "delivered" source file(s) from web server 14, such as the delivered source files 123A-123D discussed above with FIG. 1A. The delivered source files may be downloaded from web server 14 to computer 11 via a communication network 13A. The downloaded source files may be stored as delivered source files to data storage of computer 11. As discussed above, such delivered source files may differ from the original source files 19A-19D that are uploaded to web server 14. For instance, the delivered source files may include modifications made as a result of processing done by the server 14 (e.g., server-side processing 121), especially for pages like PHP, ASP, CFML, etc.

Further, the delivered source files may be modified at computer 11 to result in browser source files 136A-136D that are stored to data storage 135 of computer 11. Data storage 135 may comprise a hard disk and/or other computer-readable data storage medium that is operable for storing data. The browser source files 136A-136D are analogous to the above-described browser source files 126A-126D used by browser 18, and such browser source files 136A-136D are likewise used by browser logic 130 to generate the run-time output presentation document view 108. As discussed above, such browser source files 136A-136D may differ from the delivered source files that are downloaded from the web server 14. For instance, the browser source files 136A-136D may include modifications made as a result of processing done by the computer 11 (e.g., client in this scenario), such as the above-described client-side processing 124 of FIG. 1A, through code, such as JavaScript. Further, the browser source files 136A-136D can change as a user interacts with the run-time output presentation page 108 for performing such actions as menu selections, rollovers, search queries, etc.

Thus, run-time output presentation view 108 that is generated by browser logic 130 of development tool 12 provides an operational run-time view generated from browser source files 136A-136D, rather than a mimicked editable view that is generated from original source files 19A-19D, as provided by design view 102 of FIG. 1A. Thus, the developer can readily observe what the actual run-time output presentation page looks like and how the run-time output presentation page reacts to certain user actions, such as menu selections, search queries, etc. That is, the developer can observe the run-time output presentation page presented in run-time output presentation view 108 to see exactly what a client would observe for output presentation page 104 generated by browser 18 (in FIG. 1A).

Additionally, software development tool 12 generates presentation of run-time source code present in the browser source files 136A-136D in the run-time code view 107. As such, the developer can view the browser source code 136A-136D, as such source code is modified at a client side. In certain embodiments, visual indicators (e.g., tabs) 131A-131D may be presented to enable a user to select any one of the browser source files 136A-136D for presentation of their source code in the run-time code view 107. Thus, the textual source code of such browser source files can be selectively viewed in run-time code view 107, whereby the developer may view the modifications made to such browser source files during run-time of the page.

Accordingly, the run-time output presentation view 108 presents the run-time output presentation document that is generated by a browser (such as run-time output presentation document 104), accounting for any modifications that are made to a browser source file 136A-136D during delivery of the page for rendering by a client browser. Similarly, the run-time code view 107 presents the corresponding textual code of the browser source files 136A-136D, accounting for any modifications that are made to such browser source files 136A-136D during delivery of the page for rendering by a client browser.

Figure 1C:
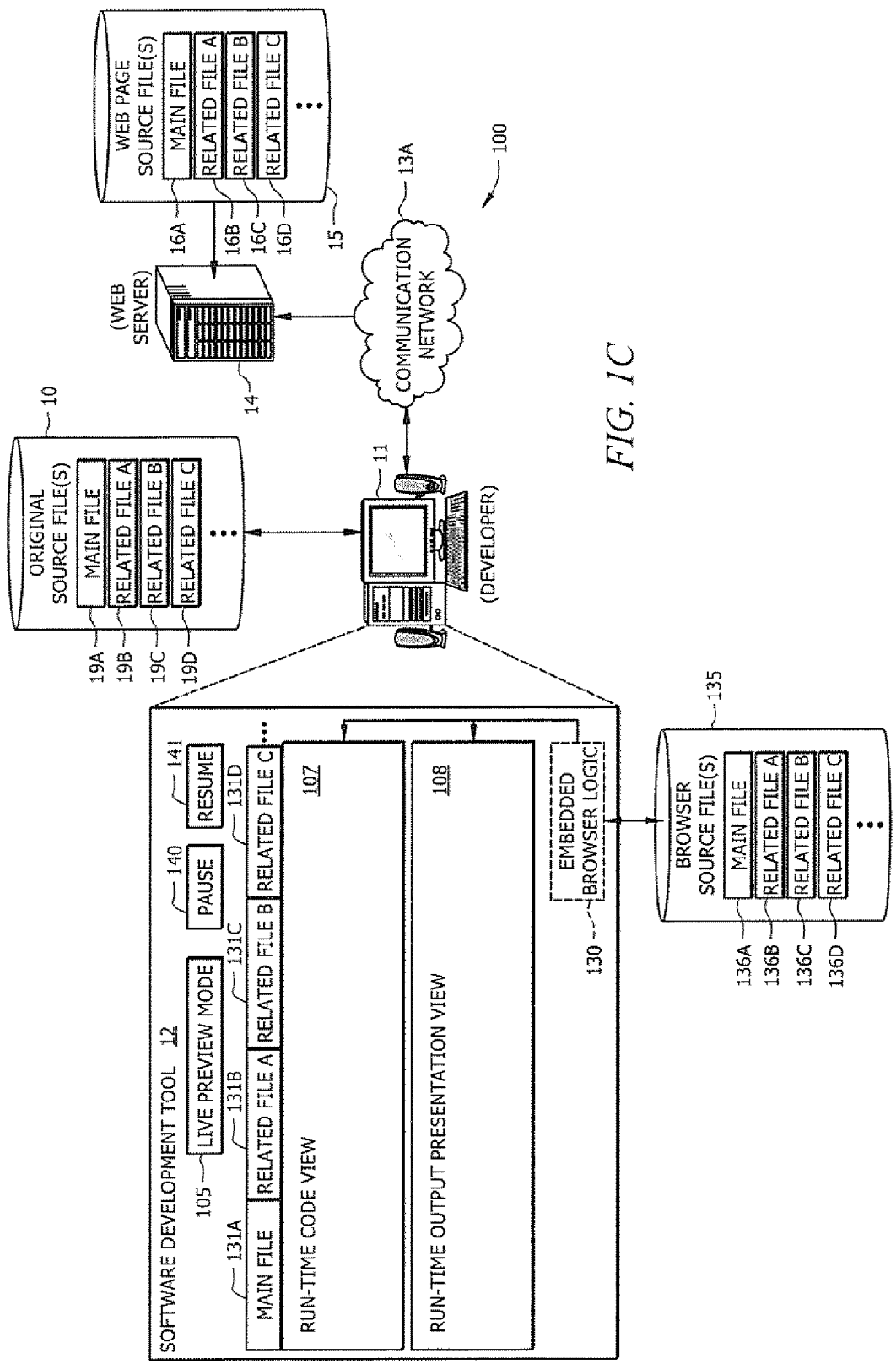

As shown in FIG. 1C, in certain embodiment embodiments, software development tool 12 presents a pause (or "freeze") feature that enables the developer to pause the functionality of certain dynamic code of a web page, such as JavaScript code. For instance, in FIG. 1C a pause button 140 is presented that when activated by a user causes such dynamic code of the run-time output presentation page to be paused. In this way, the run-time code view 107 of browser source files and/or the run-time output presentation view 108 can be analyzed in a given page state by the developer. In certain embodiments, a "resume" button 141 is provided that when activated by the user causes the dynamic code of the run-time output presentation page to resume its operation. Further details regarding exemplary embodiments of such dynamic code freezing technique for run-time web pages, which may be employed according to certain embodiments, are provided in co-pending and commonly assigned U.S. patent application Ser. No. 12/098,304 titled "SYSTEM AND METHOD FOR FREEZING OPERATION OF DYNAMIC CODE OF A RUN-TIME WEB PAGE" filed concurrently herewith, the disclosure of which is hereby incorporated herein by reference.

Accordingly, the developer can freeze JavaScript (or other dynamic code) in the live preview mode to stop the web page from reacting to user events. When JavaScript is frozen, the developer can easily inspect the page in a given state. According to one embodiment, in response to the developer's request to freeze (or "pause") the JavaScript (e.g., by selecting pause button 140), the web development tool 12 instructs the browser's JavaScript engine (e.g., of embedded browser logic 130) to not execute any more code. This keeps the browser source from changing so the user can examine the browser source (e.g., in the run-time code view 107) without it changing when the developer moves the mouse and/or performs other actions that would otherwise trigger a change by the JavaScript code. Similarly, when the resume button 141 is activated, the web development tool 12 instructs the browser's JavaScript engine (e.g., of embedded browser logic 130) to resume execution of code.

Thus, according to certain embodiments, the software development tool 12 provides the ability to stop the dynamic run-time operation, such as by freezing scripting language code (e.g., JavaScript code), so that the developer can examine specific page states. Certain embodiments of the web development tool 12 provide the developer the ability to freeze a page at a given state so that the developer can inspect the browser source files in such given state. This is especially advantageous for AJAX developers so they can see how their code changed in response to run-time events occurring in the browser.

In view of the above, the web development tool 12 provides an embedded browser 130 that supports a live preview mode that enables a run-time page to be viewed. For instance, in the live preview mode the web development tool 12 provides a run-time output presentation view 108, as would be generated by a client browser 18. Such a run-time output presentation view 108 is thus reflective of the output presentation page that is generated based on browser source code 136A-136D, rather than a mimicked output presentation that is generated based on original source files 19A-19D that being authored. In addition, the web development tool 12 provides a run-time code view 107 that enables the developer to view the browser source code and thus see how it changes during run-time of the page.

According to embodiments, authoring interactions between the run-time page (live preview mode) and the original source code (e.g., original source files 19A-19D) being authored are supported by the web development tool 12. According to certain embodiments, the developer can easily switch between the run-time browser code view 107 and the editable original source code view 101.

Figure 1D:
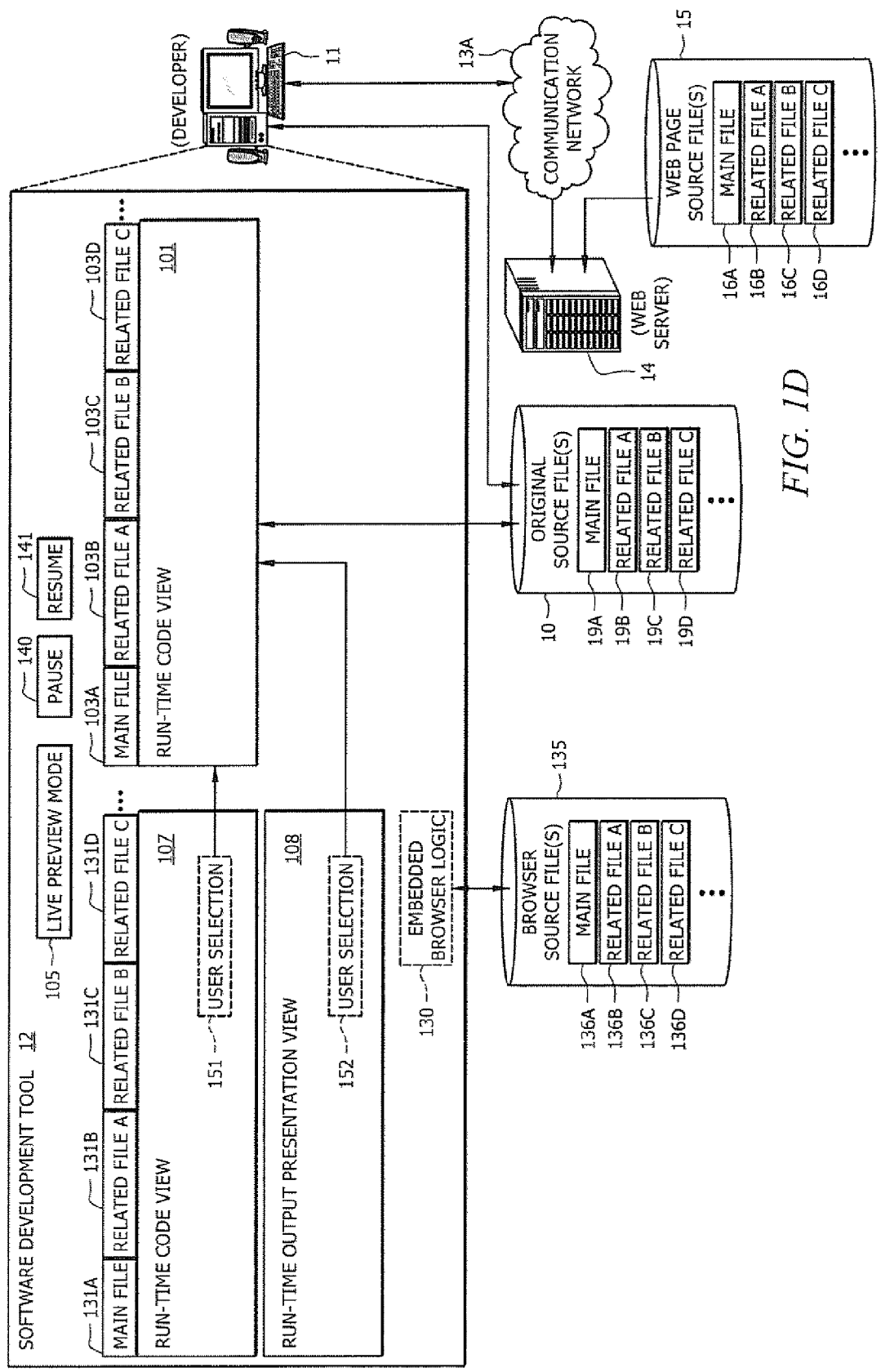

Further, in certain embodiments, the developer can select a region in the run-time output presentation view 108, such as selected region 152 in FIG. 1D, and the web development tool 12 presents the corresponding run-time browser code (in run-time code view 107) and/or the corresponding original source code (in design-time code view 101) that is responsible for the selected region. In this way, the user can easily navigate to corresponding portions of browser source code and/or original source code that contribute to the generation of the selected region of the run-time output presentation view (e.g., selection 152 in FIG. 1D). Thus, this is one example of authoring interoperability that is supported between the web development tool 12 and the run-time page views (e.g., views 107 and 108).

Further, in certain embodiments, the developer can select a region of textual browser code in the run-time code view 107, such as selected region 151 in FIG. 1D, and the web development tool 12 presents the corresponding original source code (in design-time code view 101) that is responsible for the selected region. In this way, the user can easily navigate to corresponding portions of original source code that contribute to the selected portion of the run-time browser code. Thus, this is another example of authoring interoperability that is supported between the web development tool 12 and the run-time code view 107.

In addition, when the developer makes a selection in the run-time page views (e.g., in the run-time code view 107 and/or run-time output presentation view 108), the informational panels, such as property panels, etc., that are provided by the web development tool 12 (e.g., as are commonly provided by such development tools as DREAMWEAVER) are updated to give the developer context-specific information about the selection. Thus, the web development tool 12 presents context-specific information for properties, etc., related to a selected portion of the run-time page views.

As discussed above with FIG. 1C, further authoring interoperability between the web development tool 12 and the run-time page in certain embodiments includes freezing dynamic code (e.g., JavaScript code) in the live preview mode to enable the developer to examine the run-time page (e.g., the run-time output presentation view 108 and/or the browser source code view 107) in a given page state. In addition, the developer can edit the dynamic code and/or other original source code (e.g., in design-time code view 101) while the dynamic code is frozen, and then the developer can selectively resume the dynamic code operation on the page.

In certain embodiments, further authoring interoperability between the web development tool 12 and the run-time page is provided by a code navigator tool of the web development tool 12. That is, in certain embodiments, the web development tool 12 provides a code navigation interface that aids the developer in accessing corresponding portions of code in an original source file(s) responsive to user selection of run-time output presentation or browser source code. In certain embodiments, in response to a user's selection in an active view (e.g., an active one of the views 101, 102, 107, and 108), the code navigator tool builds a list of source destinations that are relevant to that selection. For instance, in FIG. 1D the user may select a portion of textual source code of a browser source file in the run-time code view 107, such as user selection 151 indicated in FIG. 1D, and the corresponding portions of the original source file(s) 19A-19D may be presented in design-time code view 101. Alternatively, the user may select a portion of the visual output presentation shown in the run-time output presentation view 108, such as user selection 152 indicated in FIG. 1D, and the corresponding portions of the original source file(s) 19A-19D may be presented in design-time code view 101. The corresponding portions of the original source file(s) 19A-19D that contributed to the selected run-time output presentations may be identified by visual indicators, such as the tabs 103A-103D of design-time code view 101 (or by a list in a pop-up window, etc.). In this way, the developer can select any one of those contributing source files to view the relevant portion thereof in design-time code view 101.

Thus, the code navigator tool of certain embodiments further aids authoring interoperability between the run-time page views and the design-time authoring view of original source files by aiding a developer in easily and efficiently identifying and accessing corresponding portions of source files 19A-19D that contribute to a selected portion of a run-time page (that is selected in either the run-time code view 107 or run-time output presentation view 108). Thus, the user can then easily and efficiently navigate to any of the listed source destinations by clicking on its identification in the list (or its corresponding tab or other visual indicator provided by web development tool 12). A common example of this is in response to a developer selecting a portion of an HTML source (in run-time browser code 107, such as selection 151 in FIG. 1D), including in the code navigation list (e.g., presented in tabs 103A-103D of FIG. 1D, listed in a pop-up window, or otherwise visually indicated to the developer) a CSS file with a style that is applied to that selection, wherein the developer can easily jump to the corresponding portion of the CSS file that contributes to the style of the selection in the HTML source by clicking the identification of the CSS file in the code navigation list.

Thus, in certain embodiments, the web development tool 12 enables a developer to edit and inspect a visual selection (e.g., selection 152) that is made by the user in the run-time browser view 108. Also, certain embodiments provide the ability for the developer to see (e.g., in design-time code view 101) other original source code (e.g., portions of original source files 19A-19D) that is relevant to a selected portion of run-time browser source code (e.g., selection 151) and easily access that original source code to make changes. Thus, in certain embodiments, the web development tool 12 is operable to select the original source code for a corresponding browser view selection made by a developer so that the developer can easily and quickly navigate around the code through the run-time browser presentation. That is, a visual navigation is provided that enables the developer to easily and quickly view corresponding source code that is responsible for generating a selected portion of a run-time output presentation being presented in the run-time output presentation view of the web development tool. In certain embodiments, a list of source file code (e.g., list of tabs 103A-103D) that is relevant to a selection in the run-time output presentation view is provided by the web development tool 12, and the developer is taken to any of the selected source file code on the list so that the user can make desired changes to affect the corresponding selection in the run-time output presentation.

Particularly with the increasing use of AJAX, the web is becoming increasingly interactive. Traditionally, web developers edit their code in one program. Then, to preview their code and test the user interactions with a page, they have to use a browser to preview such run-time operability of the page. If the run-time page is not as is desired by the developer, the developer can View Source in the browser, which shows the source as it was delivered from the hosting web server to the client. However, with AJAX the code is additionally changed in the browser and this is not easily accessible. Even when it is accessed, the developer must locate the issue in that code, and then return to the web authoring program, find the corresponding code in the original source code, make the desired changes, and then repeat the testing process.

As discussed further herein, certain embodiments provide the developer quick access to an interactive browser view, the source as it is in the browser (i.e., browser source). In addition, the web development tool of certain embodiments provides tools to enable the developer to easily access and edit the original source code. For instance, in certain embodiments, the web development tool provides a code navigation tool that enables a developer to select portions of a run-time page (e.g., select a portion of the run-time browser code, such as selection 151, or a portion of the run-time output presentation, such as selection 152 in FIG. 1D), and the navigation tool provides quick and easy access to the corresponding portions of the original source code (e.g., in design-time code view 101 of FIG. 1D) that contribute to the selected portion of the run-time page. In this way, the web development tool aids in interoperability between the run-time page and the authoring of the original source files being developed by a developer. Thus, much greater efficiency and usability is provided by the web development tool that comprises such an embedded run-time browser view than is obtained through use of an external web browser program that is disconnected from the web development tool and that does not provide such authoring interoperability.

In view of the above, according to certain embodiments, a web page authoring tool 12 includes an embedded interactive browser preview interface that provides a live (or "run-time") preview mode. The live preview mode is different the traditional design view provided by certain web development tools. First, the live preview mode provides an actual run-time output presentation 108 of the page, such as that generated by a client browser 18, which is generated from browser source code that includes modifications made to the source code at the server and/or at the browser (i.e., provides the actual page as generated by the browser source code), rather than providing a mimicked output presentation that is generated from original source code.

Further, the live preview mode provides a run-time operable page, rather than an editable page. For instance, the run-time page will respond to user interactions like a client browser does. Accordingly, the run-time page presented in the run-time output presentation view of the web development tool responds to "mouse over" (or "hover") events, menu selections, and other user interactions just as it would at run-time in a client browser.

As mentioned above, developers traditionally launch a separate browser application for testing and analyzing the output and operability of a web page being authored. That is, in some instances, an application (such as a web development application) may provide an ability for the developer to launch such a separate browser application. However, once the browser application is launched from the authoring application, the browser application remains separate with little or no interaction between it and the application from which it was launched, and particularly no web page authoring interaction is supported between the browser and the launching application for authoring original source files.

According to certain embodiments, the run-time output presentation provided by the web development tool in the live preview mode provides certain authoring interoperability with the web development tool that is not available when employing traditional separate browser applications. Additionally, when the developer clicks in the run-time output presentation view, the web development tool's panels update to provide the developer context-specific information about the developer's selection.

The live preview mode also allows the developer to switch the code view between the original source code (e.g., design-time code view 101) that the developer can edit and the browser source code (e.g., run-time code view 107) that appears in the browser during run-time. In both cases, when the developer clicks in the run-time output presentation view 108, the web development tool 12 sync's the code view (e.g., run-time code view 107 and/or design-time code view 101) to reflect the textual code responsible for the selected region in the output presentation view. When the browser source code is being presented (e.g., in the run-time code view 107), the web development tool 12 gets the source offsets from the browser and selects them in the code view. When the original source code is being presented (e.g., in the design-time code view 101), the web development tool 12 gets the offsets, figures out where they are in the browser source, does a tag-wise difference between the browser source and original source, and then selects the corresponding tags in the original source.

This view may be integrated with other editing features so that the page can still be edited through the code view, panels and other tools. Also, the user can see and edit both the page source and the source as it was manipulated by the browser.

Additionally, as discussed above, in certain embodiments the user can freeze JavaScript in live mode to stop the run-time web page being presented in the run-time output presentation view 108 from reacting to user events. When JavaScript is frozen the user can easily inspect the page in a given state. In response to the developer's request to freeze (or "pause") the JavaScript, the web development tool 12 instructs the browser's JavaScript engine to not execute anymore code. This keeps the browser source from changing so the user can examine the browser source (e.g., in the run-time code view 107) without it changing when they move their mouse and/or perform other actions that would otherwise trigger a change by the JavaScript code.

Lastly, embodiments of the web page authoring tool 12 include a number of ways to quickly get to relevant pieces of source code. One way is through syncing selection code view when the user clicks in the live preview, both in the browsers source and in the users source which is more useful for editing but more difficult to accomplish since it no longer matches the source in the browser. There is also the code navigator which presents a context sensitive list of destinations in the code.

As discussed further herein, in certain embodiments a code navigator tool is provided by the web page authoring tool 12. In one embodiment of such code navigator tool, the web development tool 12 gets the current user selection in the active view (e.g., the active one of views 101, 102, 107, and 108), then builds a list of source destinations that are relevant to that selection. This is partially a composite list of information that is available in different panels. In certain embodiments, all of that information is presented in a nice list that is convenient for access by the developer, such as a list in a pop-up window that arranged close to the current position of the user's mouse. When the user clicks on a list item, the web development tool 12 takes the user to that part of the source code. A common example is from an HTML source selection by a user, where the navigation tool enables the user to easily go to a CSS file with a style that is applied to that HTML source selection.

Certain embodiments enable quicker iterations between editing source code and getting an interactive preview. Also, certain embodiments provide a developer the ability to see the run-time browser source code, then quickly access original source code to make changes. Being able to quickly go between original source, browser view, and browser source is advantageous for the developer.

Additionally, certain embodiments further provide the ability to stop the dynamic run-time operation, such as by freezing scripting language code (e.g., JavaScript code), so that the developer can examine specific page states. Certain embodiments of the web development environment provide the developer the ability to freeze a page at a given state so that the developer can inspect the source. This is especially advantageous for AJAX developers so they can see how their code changed in response to run-time events occurring in the browser.

In certain embodiments, the web development tool enables a developer to edit and inspect the visual selection in a browser. Also, certain embodiments provide the ability for the developer to see other original source code that is relevant to a selection of run-time browser source code and easily access that original source code to make changes. Thus, in certain embodiments, the web development tool is operable to select the original source code for a corresponding browser view selection made by a developer so that the developer can easily and quickly navigate around the code through the run-time browser presentation. That is, a visual navigation is provided that enables the developer to easily and quickly view corresponding source code that is responsible for generating a selected portion of a run-time output presentation being presented in the run-time output presentation view of the web development tool. In certain embodiments, a list of source file code that is relevant to a selection in the run-time output presentation view is provided by the web development tool, and the developer is taken to any of the selected source file code on the list so that the user can make desired changes to affect the corresponding selection in the run-time output presentation.

FIGS. 2A-2D show an exemplary user interface provided by software development tool 12 according to one embodiment. As in the above example of FIGS. 1A-1D, a first processor-based computer 11, such as a personal computer (PC), laptop computer, server computer, workstation computer, etc., is provided on which a software development tool (e.g., web authoring application) 12 is executing.

Figure 2A:
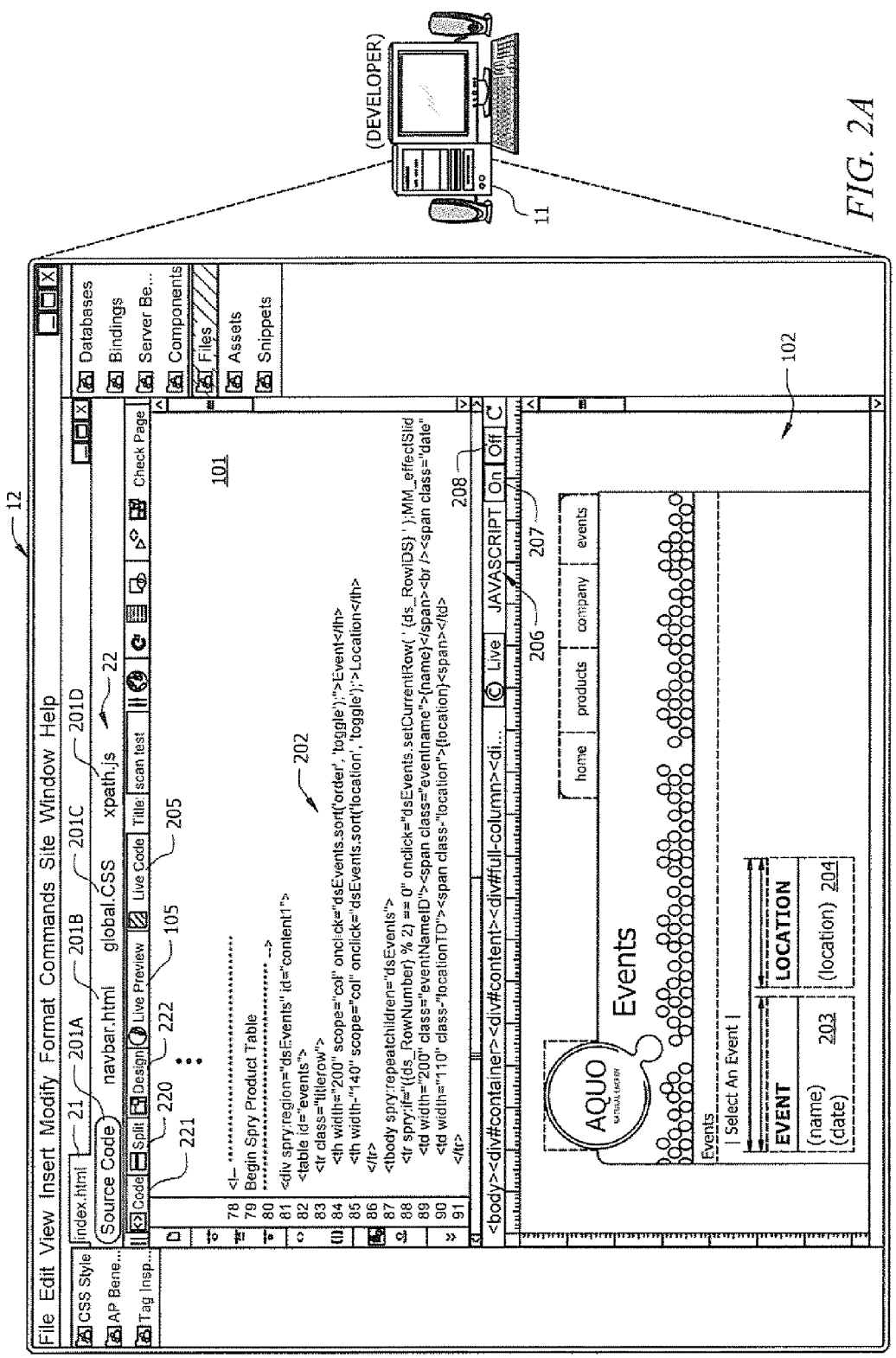
FIGS. 2A-2D show an exemplary user interface provided by the software development tool according to one embodiment.

As shown in FIG. 2A, software development tool 12 provides a user interface that presents a code view 101 and a design view 102. This is an exemplary split-screen interface that results from the selection of "split" button 220, wherein the development tool's interface is split to show both the code view 101 and the design view 102. Instead of the split-screen view, the developer may alternatively select code button 221 to display the code view 101 in the full interface, or the developer may alternatively select design button 222 to display the design view 102 in the full interface.

In this example, a tool bar 22 is associated with the code view 101, which provides visual indicators (e.g., tabs) that identify source files for a given application (e.g., web page or web site) that is under development. In this example, a main file "index.html" is opened by a user, and such main file is identified in a visual indicator 21. The software development tool 12 searches through the main file and determines other related files that are used along with the main file (e.g., by a browser) for building an output presentation document. Visual indicators (e.g., tabs) identifying such related files are then presented on tool bar 22.

In the illustrated example, tool bar 22 has a "source code" tab 201A presented, which when selected by a user causes the textual source code of the main file "index.html" to be presented in the code view 101. For instance, in the example of FIG. 2A, the source code tab 201A is selected (as indicated by it being highlighted), and thus the textual source code 202 of the main file "index.html" is presented in the code view 101. In this example, such main file "index.html" that is presented in code view 101 is an original source file, such as original source file 19A shown in FIGS. 1A-1D, being authored by the developer.

Additionally, tool bar 22 has tabs 201B-201D presented, each of which identifies a related file, such as a CSS file, a JS file, etc. For instance, tabs 201B-201D identify related files "navbar,shtml", "global.css", and "xpath.js", respectively. When any one of the tabs 201B-201D is selected by the user, the textual source code of the corresponding related original source file is alternately presented in the code view 101.

Figure 2B:
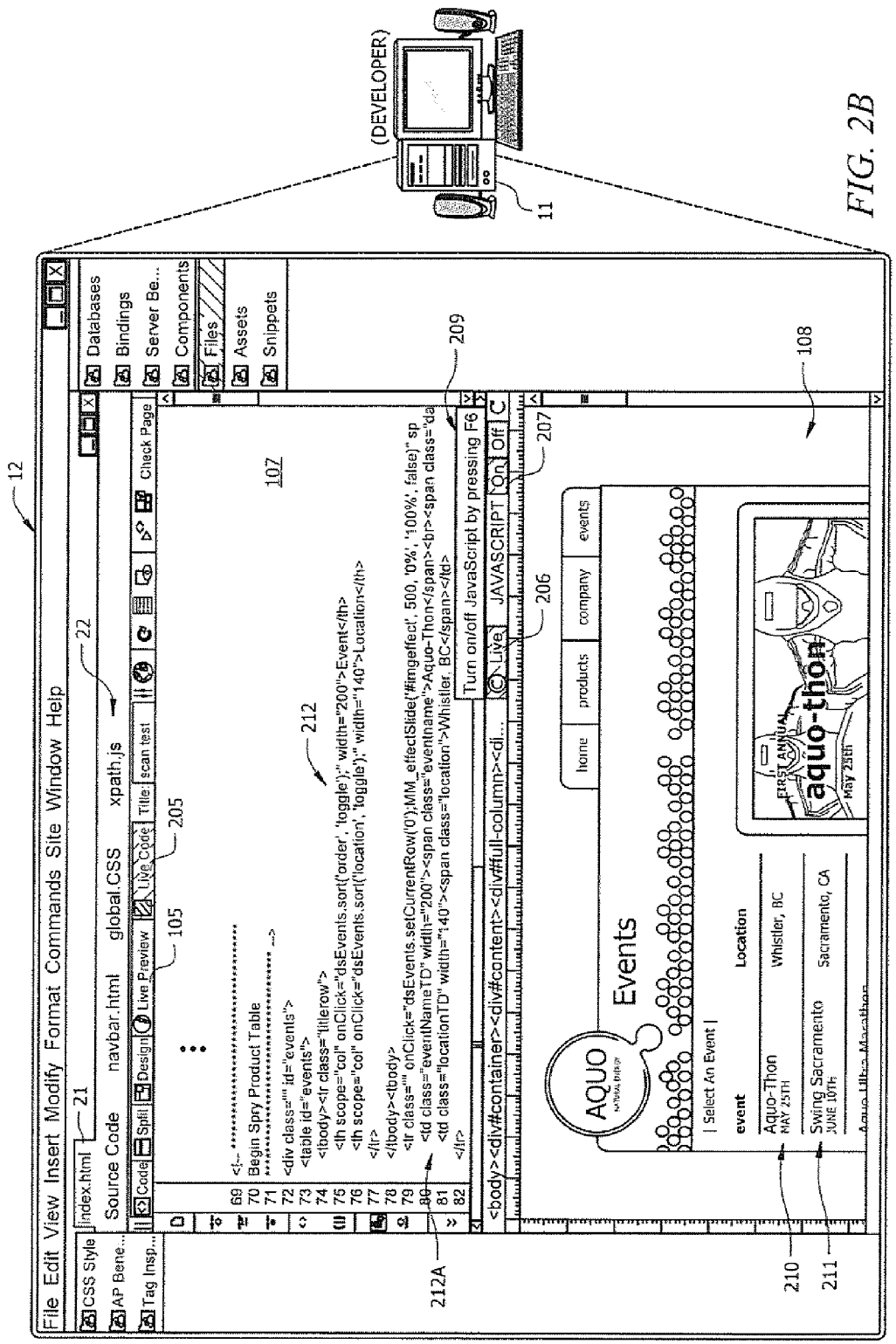

In this example, the development tool's interface further includes a live preview button 105 that when activated by a user activates the live preview mode, and thus results in run-time browser source code being presented in the code view (e.g., resulting in run-time code view 107 of FIGS. 1B-1D) and results in run-time output presentation generated by such run-time browser source code to be presented in the design view (e.g., resulting in run-time output presentation view 108 of FIGS. 1B-1D). An example of the resulting run-time page views that are presented in response to the live preview mode being activated is shown in FIG. 2B, which is discussed further below.

The exemplary interface of FIG. 2A further includes "Live Code" indicator 205 that becomes active when the live preview mode is activated to indicate whether the code being presented in the code view interface is browser code (i.e., live code) or is design-time code of an original source file. Because the live preview mode is not active in FIG. 2A, the Live Code indicator 205 is also inactive.

The exemplary interface of FIG. 2A further includes "Live" indicator 206 that indicates whether the live preview mode is active. For instance, such Live indicator 206 may be highlighted when the live preview mode is active to provide a visual cue to the developer that he is viewing and interacting with a run-time page. Because the live preview mode is not active in FIG. 2A, the Live indicator 206 is not highlighted.

The exemplary interface of FIG. 2A further includes JavaScript On button 207 and JavaScript Off button 208. The Off button 208 may be activated to pause or freeze JavaScript code for the run-time page, as described above with the pause button 140 of FIGS. 1C-1D. The On button 207 may be activated to resume JavaScript code for the run-time page, as described above with the resume button 141 of FIGS. 1C-1D. Because the live preview mode is not active in FIG. 2A, the JavaScript On and Off buttons 207/208 are also inactive.

The design view 102 of FIG. 2A provides a mimicked output presentation view that is derived based on original source files. Such mimicked output presentation fails to accurately present a true representation of what the run-time output presentation document will be when generated by a browser (e.g., as result of processing a browser source file). For instance, in this example, the design view present certain "placeholders", such as placeholder 203 for an event name and date, and placeholder 204 for an event location. Such placeholders are for information that will be populated from a database, search engine, or other data source in the run-time output presentation of the page, such as shown in the corresponding outputs 210 and 211 for events presented in the run-time output presentation 108 in FIG. 2B. Additionally, the mimicked view provided by the design view 102 of FIG. 2A provides an editing preview, rather than a run-time operational view of the output presentation document. For example, if a user clicks on a button presented in the mimicked output presentation document in the design view 102, such as one of the "home", "products", "company", or "events" buttons, the user may be allowed to edit the button (such as edit its text or other properties), rather than activating the operational functionality of the button as when it is clicked in run-time.

FIG. 2B shows a responsive live-page interface presented by the web development tool 12 responsive to the user activating the live preview button 105 in FIG. 2A. In response to such activation of the live preview mode, software development tool 12 generates presentation of a visual layout of a generated run-time output presentation document in the run-time output presentation view 108. For instance, software development tool 12 may effectively employ an integrated browser (e.g., browser logic 130 of FIGS. 1B-1D) to generate the run-time output presentation view 108, such that the run-time output presentation view 108 presents the actual run-time output presentation document, such as would presented by a client browser.

Thus, run-time output presentation view 108 that is generated by browser logic of development tool 12 provides an operational run-time view generated from browser source files, rather than a mimicked editable view that is generated from original source files, as provided by design view 102 of FIG. 2A. Thus, the developer can readily observe what the actual run-time output presentation page looks like and how the run-time output presentation page reacts to certain user actions, such as menu selections, search queries, etc. That is, the developer can observe the run-time output presentation page presented in run-time output presentation view 108 to see exactly what a client would observe for the output presentation page generated by a client browser.

In the example of FIG. 2B, the Live indicator 206 is highlighted to indicate to the user that the live preview mode is active. In addition, the JavaScript On button 207 is highlighted to indicate that JavaScript code is active for the run-time page. In this example, a visual indicator 209 (in the form of a pop-up text box) is provided to inform the user that the JavaScript may be turned off by pressing F6. Thus, a hot-key may be recognized by the web development tool 12 for turning JavaScript code on and off in the live preview mode.

Additionally, software development tool 12 generates presentation of run-time source code present in the browser source files in the run-time code view 107. As such, the developer can view the browser source code, as such source code is modified at a client side. For instance, the developer may select to view, in run-time code view 107, the run-time source code for any of the source files, such as the main "index.html" file, or the related files navbar.shtml, global.css, or xpath.js, by selecting a corresponding one of the tabs on the toolbar 22. In the illustrated example of FIG. 2B, the run-time source code 212 of index.html file is being presented in the run-time code view 107. The Live Code indicator 205 is highlighted to indicate that the developer is viewing the run-time browser code in the interface 107, rather than the original source file code as was presented in code view 101 of FIG. 2A.

As can be seen in FIG. 2B, the run-time browser code 212 of index.html is modified to be populated with information for generating the listed events 210 and 211 in the run-time output presentation view 108. For instance, the run-time browser code 212 includes code portion 212A that populates the event information 210 and 211 for the page. Such event information is not included in the original source file of index.html, but is instead populated into the browser source file of index.html by an external source (e.g., by another file, database, etc.). Thus, in the run-time code view 107 of FIG. 2B, the developer can view the modified browser source code for the index.html file, which generates the actual run-time output presentation 108 of the page.

Figure 2C:
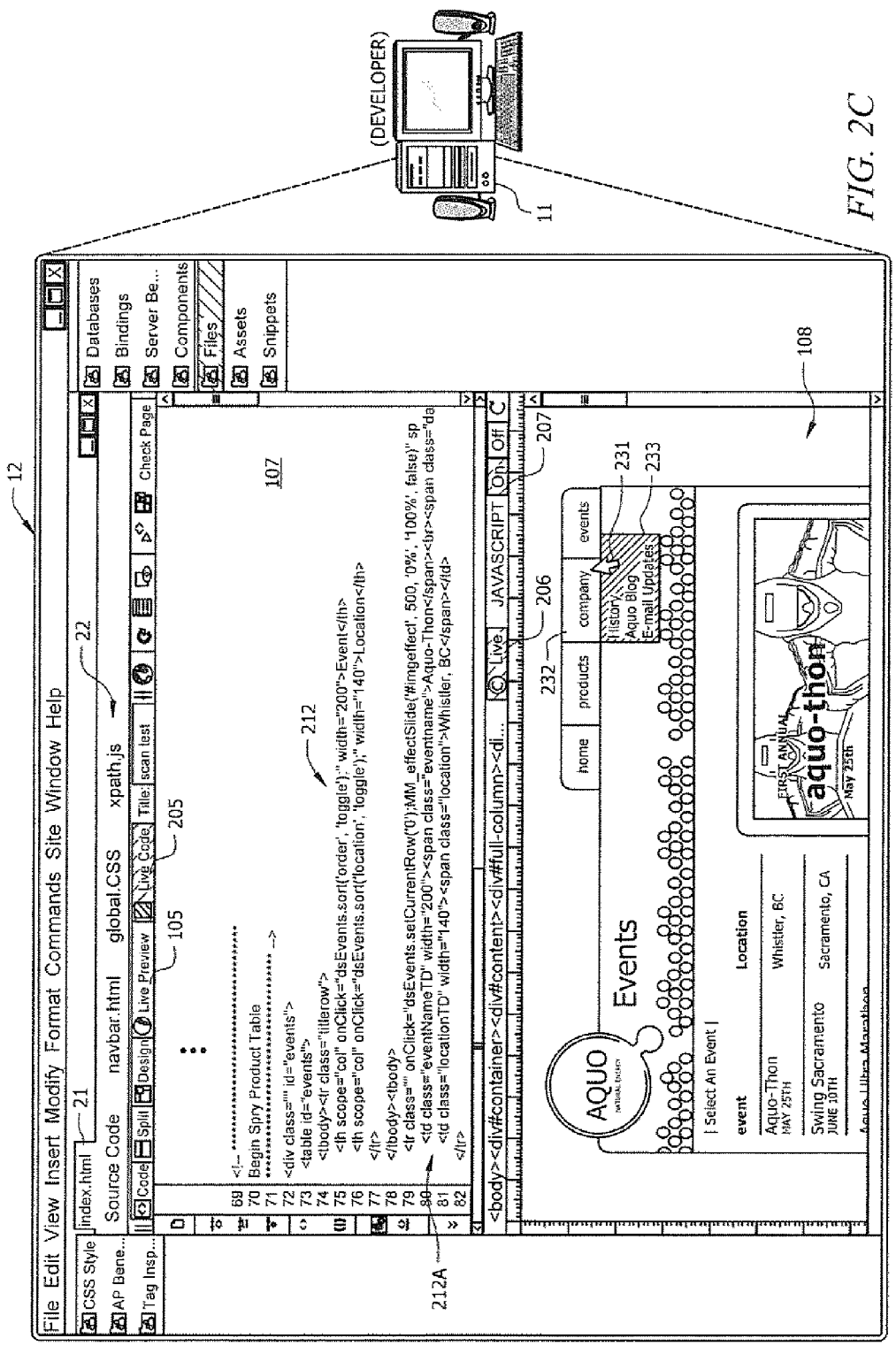

When live preview mode is active and the JavaScript for the page is turned on, the run-time output presentation 108 of the page is fully operational just as it would be if generated by a client browser. Thus, the page reacts accordingly to certain events, such as mouse hover, mouse click, search queries, and/or other user input events. For instance, as shown in FIG. 2C, when the user hovers cursor 231 over the company button 232, a drop-down menu 233 is presented, which presents certain selectable options as "History", "Aquo Blog", and "E-mail Updates". Thus, the developer can test and analyze certain operational characteristics of the run-time page by interacting with the run-time output presentation in live preview mode with the JavaScript code turned on for the page.

Further, the developer can choose to pause the functionality of certain dynamic code of the web page, such as JavaScript code, thereby enabling the developer to analyze the page in a given state. For instance, if in FIG. 2C the developer desires to analyze the run-time page further while it is in the state shown in FIG. 2C (i.e., with the drop-down menu 233 being presented responsive to the hovering of cursor 231 over company button 232, the developer may choose to freeze the JavaScript code of the run-time page (e.g., by pressing a hot-key, such as F6). In response, the JavaScript code may be turned off, as indicated by the "Off" indicator 208 in FIG. 2D. Then, the user may perform actions, such as hovering the cursor 231, clicking on portions of the presentation output page 108, etc. that would otherwise activate some responsive function if JavaScript were turned on, but the run-time page view 108 will not be so responsive to those actions with the JavaScript turned off.

Instead, with the JavaScript functionality turned off (as in FIG. 2D) the web development tool 12 may respond to certain actions, such as the user clicking on a portion of the run-time presentation output page 108 to aid the user in analyzing and/or authoring the code for the page. For instance, responsive to the user clicking a mouse with the cursor positioned over company button 232 in the JavaScript frozen state of FIG. 2D, the web development tool 12 may jump the browser source code view 107 to a corresponding portion 212B of the index.html browser source file code 212 that contributes to (or is responsible for) the presentation of the company button 232 and its drop-down menu 233. In certain embodiments, the developer may likewise access corresponding portions of original source file code, such as by clicking the "source code" tab 201A and/or by deactivating the live code indicator 205. Thus, the developer may easily and efficiently identify and access corresponding portions of browser source code and/or original source code that is responsible for generation of a selected region or portion of the run-time output presentation page 108.

Figure 2D:
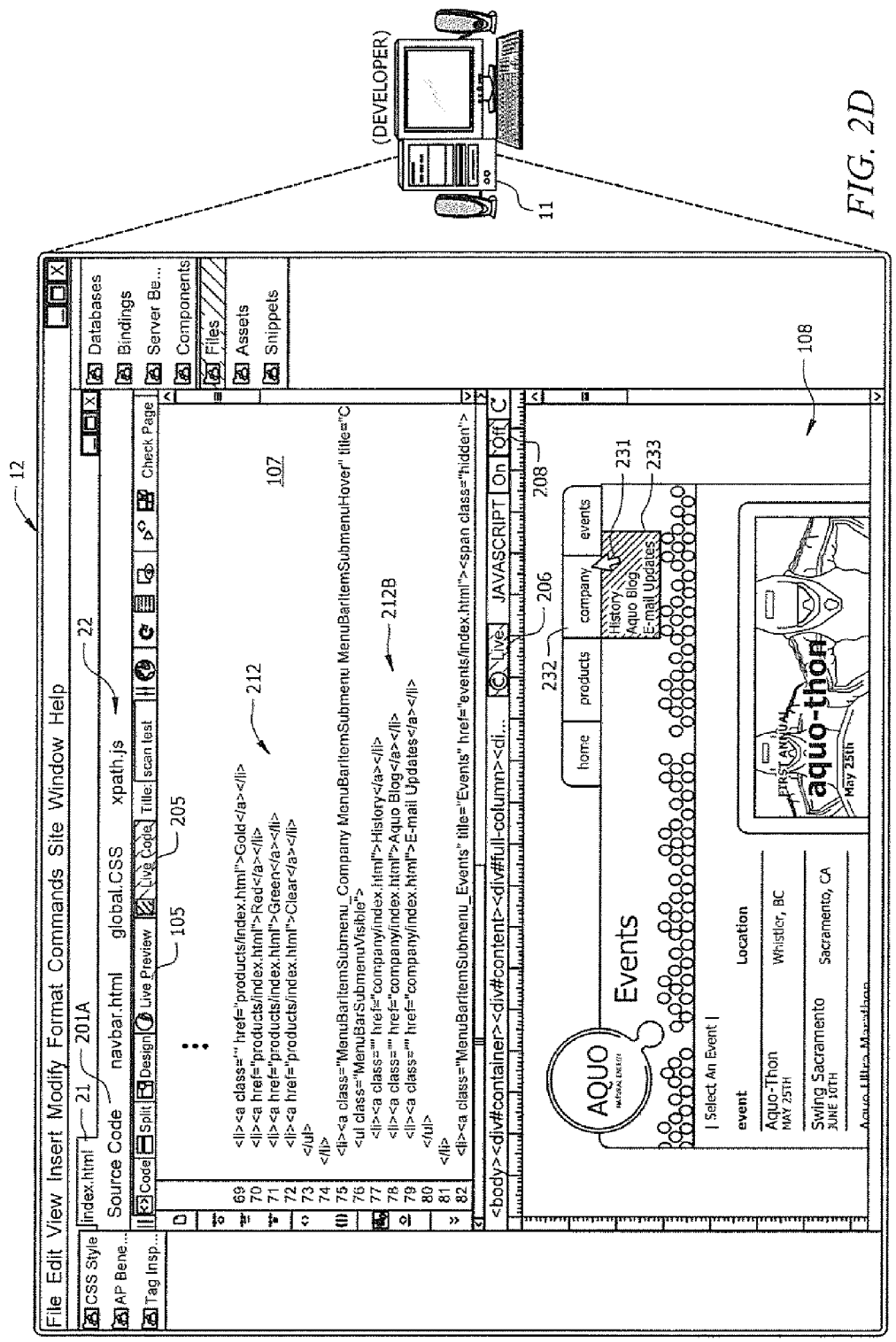
Figure 3A:
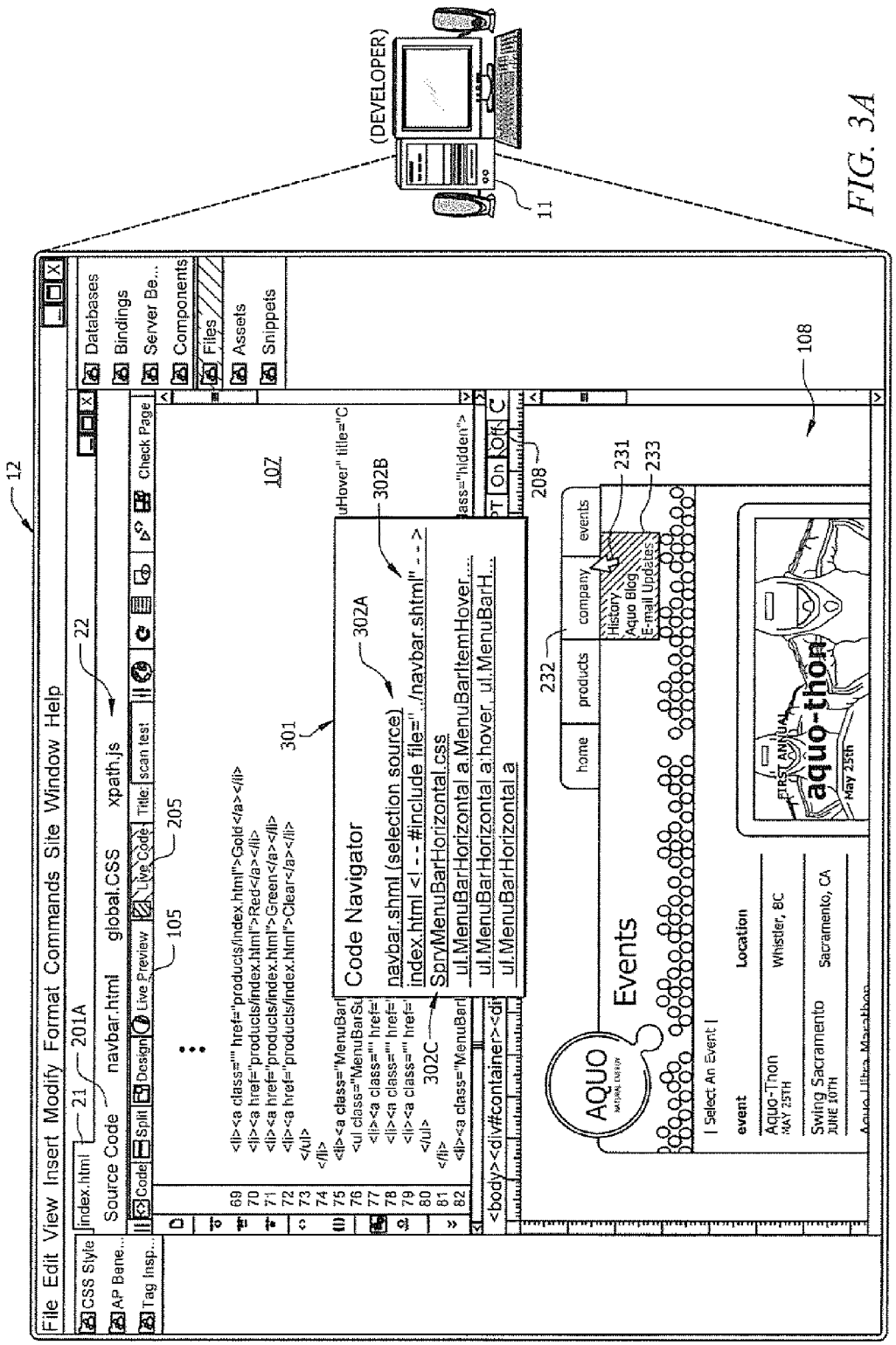
FIGS. 3A-3C further show an exemplary user interface provided by the software development tool according to one embodiment.
Figure 3B:
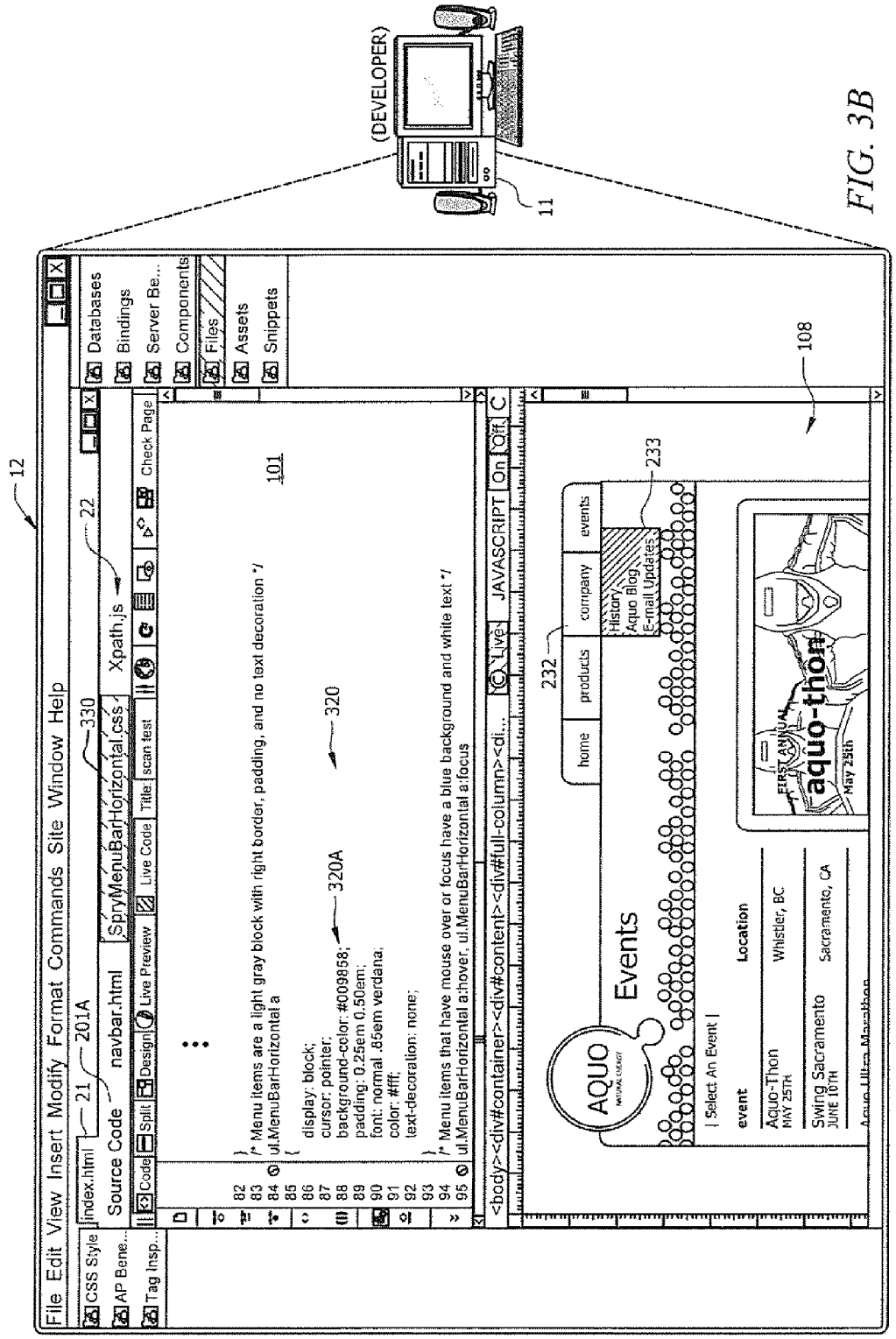
Figure 3C:
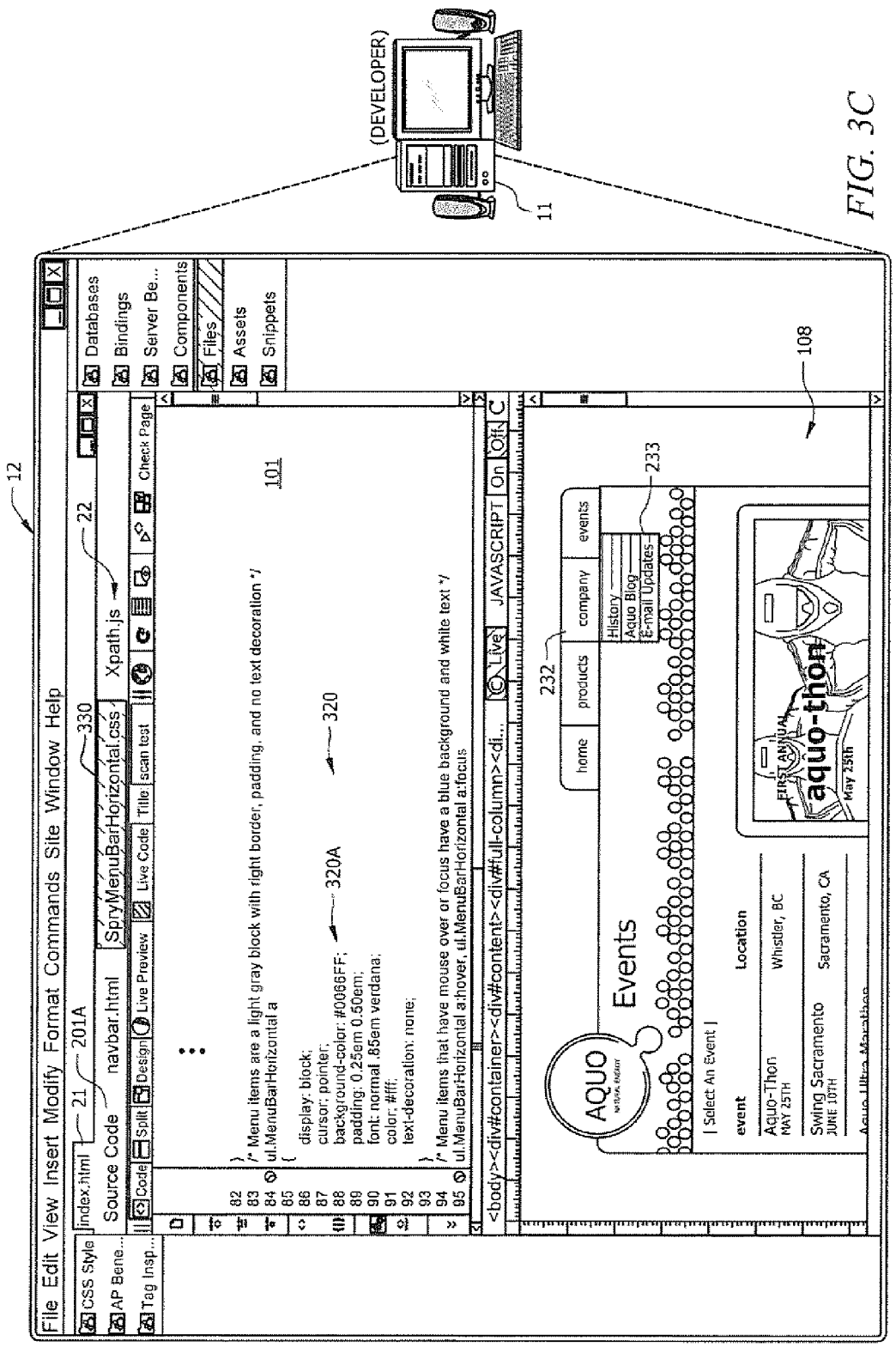

Turning now to FIGS. 3A-3C an exemplary user interface provided by software development tool 12 according to one embodiment is further shown. As in the above example of FIGS. 2A-2D, a first processor-based computer 11, such as a personal computer (PC), laptop computer, server computer, workstation computer, etc., is provided on which a software development tool (e.g., web authoring application) 12 is executing.

As with FIG. 2D discussed above, in FIG. 3A software development tool 12 provides a user interface that presents a run-time code view 10 and a run-time output presentation view 108. As in FIG. 2D, in this example live preview mode is turned on but the JavaScript code is turned off, as indicated by Off indicator 208. In this example, the user has requested a code navigator tool to be displayed, which is presented as a pop-up window 301 in this example. For instance, with the live preview mode active and the JavaScript code turned off, the developer may input a request for a code navigator tool, such as by double clicking a mouse with cursor 231 positioned over drop-down menu 233. In response, the code navigator interface 301 may be presented, which provides a list of original source destinations that are relevant to the user's selection (i.e., to the drop-down menu 233 in this example). In the illustrated example, the code navigator interface 301 presents a list that includes identification of navbar.shtml 302A, index.html 302B (which makes reference to or "includes" the navbar.shtml file), and a CSS file "SpryMenuBarHorizontal.css" 302C. The listed source files each contribute in some way to the output presentation of the selected drop-down menu 233 in the run-time output presentation 108. Thus, the user can then easily and efficiently navigate to any of the listed source destinations to analyze and/or modify the corresponding source code (e.g., to modify the drop-down menu 233 in some way) by clicking on its identification in the list.

For instance, if the user selects (e.g., by clicking the mouse on) the SpryMenuBarHorizontal.css link 302C in FIG. 3A, the design-time code view 101 presents source code 320 of such selected original SpryMenuBarHorizontal.css source file, as shown in FIG. 3B. In the example of FIG. 3B, the toolbar 22 is updated to identify the SpryMenuBarHorizontal.css file as being selected for viewing in the design-time code view 101.

In addition, the code view 101 may be focused directly on the corresponding portion 320A of the original source code 320 that contributes to some aspect of the user-selected drop-down menu 233 in the run-time output presentation 108. For instance, in the illustrated example of FIG. 3B, the code 320A of this CSS file defines the background color of the drop-down menu 233.

If the user desires to change the background color of the drop-down menu, the user may edit the portion 320A of the CSS code, as shown in FIG. 3C, thereby changing the color of the background of the drop-down menu 233. In response to the changed source code 320A to change the background color, the run-time output presentation 108 is updated to reflect the new background color of the drop-down menu 233.

Thus, in view of the above, the developer may easily navigate, via the code navigator tool 301, to a relevant portion of original source code that contributes to some characteristic/property of a selected region/portion of the run-time output presentation 108. Further, the developer can then analyze and/or modify the corresponding original source code, and readily view the effect of any modifications to such original source code on the selected region/portion of the run-time output presentation 108.

Figure 4:
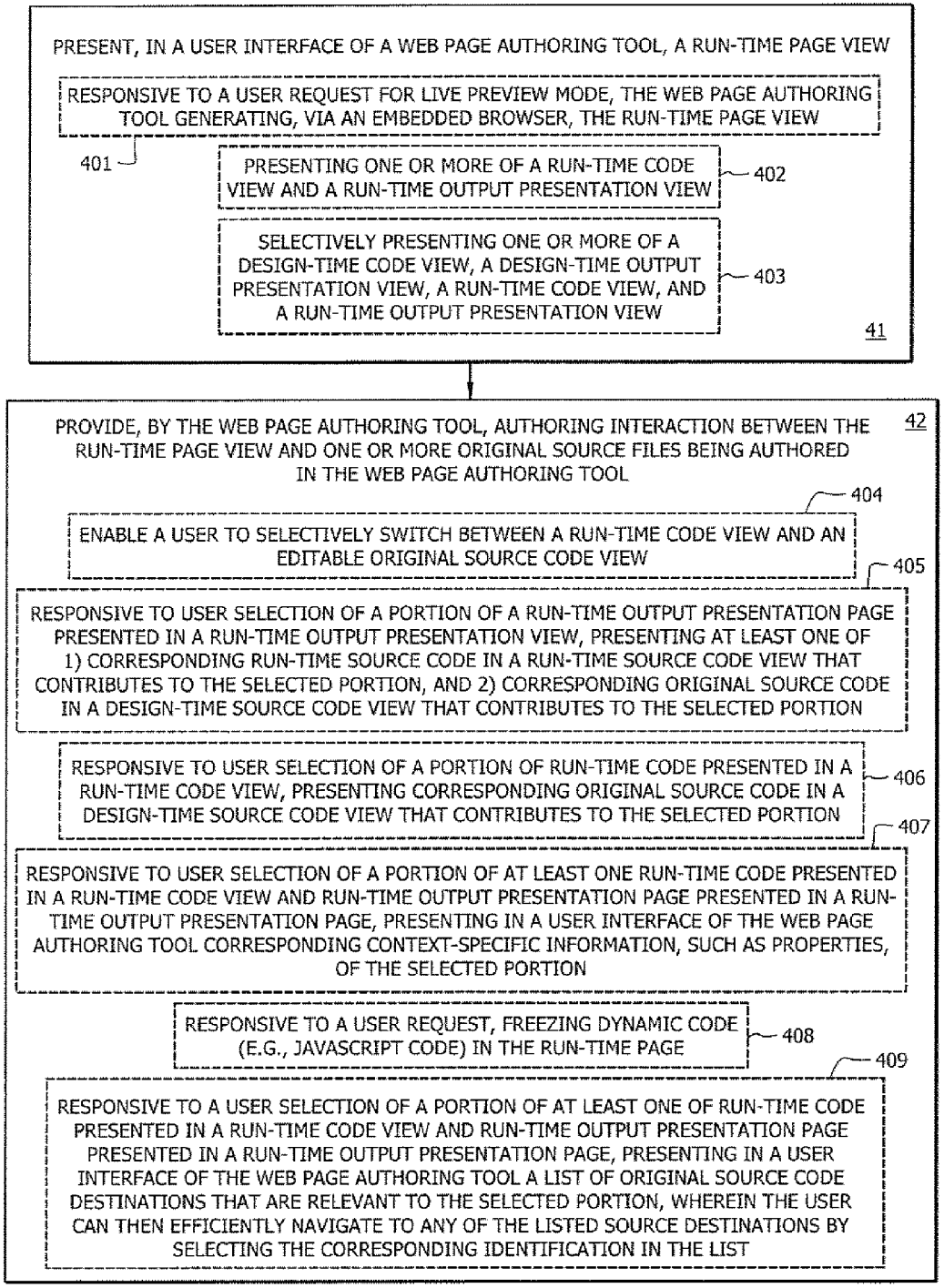
FIG. 4 shows an operational flow diagram of the web authoring tool according to one embodiment.

Turning to FIG. 4, an operational flow diagram of web authoring tool 12 according to one embodiment is shown. In operational block 41, web page authoring tool 12 presents in a user interface a run-time page view. As shown in the optional dashed sub-block 401, in certain embodiments, responsive to a user request to the web page authoring tool 12 for live preview mode (e.g., via activating live preview button 105), the web page authoring tool 12 generates, via an embedded browser 130, the run-time page view.
As shown in the optional dashed sub-block 402, in certain embodiments, the web page authoring tool 12 presents one or more of a run-time code view 107 and a run-time output presentation view 108. As shown in the optional dashed sub-block 403, in certain embodiments, the web page authoring tool 12 is operable to selectively present (e.g., responsive to user input), one or more of a design-time code view 101, a design-time output presentation view 102, a run-time code view 107, and a run-time output presentation view 108.

In operational block 42, the web page authoring tool 12 provides authoring interaction between the run-time page view (e.g., the run-time code view 107 and/or the run-time output presentation view 108) and one or more original source files 19A-19D being authored in the web page authoring tool 12. As shown in the optional dashed sub-block 404, in certain embodiments, such authoring interaction comprises enabling, by the web page authoring tool 12, a user to selectively switch between a run-time code view 107 and an editable original source code view 101.

As shown in the optional dashed sub-block 405, in certain embodiments, the authoring interaction comprises, responsive to user selection of a portion of a run-time output presentation page presented in a run-time output presentation view 108, presenting by the web page authoring tool 12, in a run-time source code view 108, corresponding run-time source code (or "browser source" code 136A-136D) that contributes to the selected portion. Additionally or alternatively, as likewise shown in the optional dashed sub-block 405, in certain embodiments, the authoring interaction comprises, responsive to user selection of a portion of a run-time output presentation page presented in a run-time output presentation view 108, presenting by the web page authoring tool 12, in a design-time source code view 101, corresponding original source code (e.g., of original source files 19A-19D) that contributes to the selected portion.

As shown in the optional dashed sub-block 406, in certain embodiments, the authoring interaction comprises, responsive to user selection of a portion of run-time code presented in a run-time code view 107, presenting, in a design-time source code view 101 of the web page authoring tool 12, corresponding original source code (e.g., of original source files 19A-19D) that contributes to the selected portion.

As shown in the optional dashed sub-block 407, in certain embodiments, the authoring interaction comprises, responsive to user selection of a portion of at least one of run-time code presented in a run-time code view 107 and run-time output presentation page presented in a run-time output presentation view 108, presenting in a user interface (e.g., panel interface, etc.) of the web page authoring tool 12 corresponding context-specific information of the selected portion, such as corresponding properties, etc.

As shown in the optional dashed sub-block 408, in certain embodiments, the authoring interaction comprises, responsive to a user request to the web page authoring tool 12 (e.g., by inputting a hot-key sequence, such as F6), freezing operation of dynamic code, such as JavaScript code, in the run-time page.

As shown in the optional dashed sub-block 409, in certain embodiments, the authoring interaction comprises, responsive to a user selection of a portion of at least one of run-time code presented in a run-time code view 107 and run-time output presentation page presented in a run-time output presentation view 108, presenting in a user interface (e.g., a pop-up window 301 shown in FIG. 3A) of the web page authoring tool 12 a list of original source code destinations that are relevant to the selected portion. As further shown in sub-block 409, responsive to user selection of one of the listed original source code destinations (e.g., destination 302C in FIG. 3A), the web page authoring tool 12 presenting the corresponding original source code destination (e.g., code 320 of FIG. 3B) to the user in an editable design-time code view interface (e.g., design-time code interface 101 of FIG. 3B).

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 5:
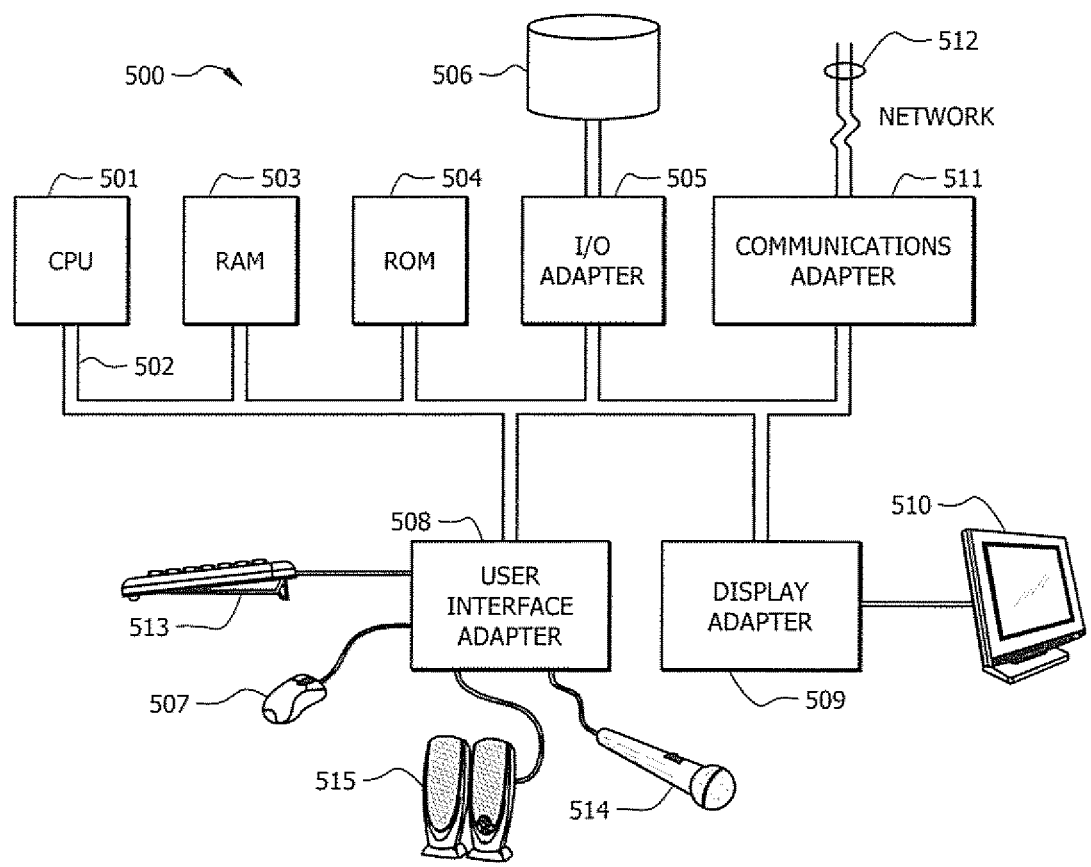
FIG. 5 shows an exemplary system on which embodiments may be implemented.

FIG. 5 illustrates an exemplary computer system 500 on which software development tool 12 may be implemented according to one embodiment. Thus, computer system 500 may be deployed to implement a designer computer 11 on which development tool 12 resides/executes. Computer system 500 may similarly be employed to implement a client computer 17 on which browser 18 resides/executes, or even a web server 14 which hosts a page's source files 16A-16D.

Central processing unit (CPU) 501 is coupled to system bus 502. CPU 501 may be any general-purpose CPU. The present invention is not restricted by the architecture of CPU 501 (or other components of exemplary system 500) as long as CPU 501 (and other components of system 500) supports the inventive operations as described herein. CPU 501 may execute the various logical instructions according to embodiments. For example, CPU 501 may execute machine-level instructions according to the exemplary operational flow described above in conjunction with FIG. 4 and/or for performing other operations described herein as being performed by development tool 12.

Computer system 500 also preferably includes random access memory (RAM) 503, which may be SRAM, DRAM, SDRAM, or the like. Computer system 500 preferably includes read-only memory (ROM) 504 which may be PROM, EPROM, EEPROM, or the like. RAM 503 and ROM 504 hold user and system data and programs, as is well known in the art.

Computer system 500 also preferably includes input/output (I/O) adapter 505, communications adapter 511, user interface adapter 508, and display adapter 509. I/O adapter 505, user interface adapter 508, and/or communications adapter 511 may, in certain embodiments, enable a user to interact with computer system 500 in order to input information, such as interacting with a user interface of a development tool 12, as described above.

I/O adapter 505 preferably connects to storage device(s) 506, such as one or more of hard drive, compact disc (CD) drive, floppy disk drive, tape drive, etc. to computer system 500. The storage devices may be utilized when RAM 503 is insufficient for the memory requirements associated with storing data for operations of the development tool 12. Communications adapter 511 is preferably adapted to couple computer system 500 to network 512, which may enable information to be input to and/or output from system 500 via such network 512 (e.g., the Internet or other wide-area network, a local-area network, a public or private switched telephony network, a wireless network, any combination of the foregoing). User interface adapter 508 couples user input devices, such as keyboard 513, pointing device 507, and microphone 514 and/or output devices, such as speaker(s) 515 to computer system 500. Display adapter 509 is driven by CPU 501 to control the display on display device 510 to, for example, display information pertaining to an application under development, such as design-time code view 101, design view 102, run-time code view 107, and/or run-time output presentation view 108 of development tool 12, as discussed above, according to certain embodiments.

It shall be appreciated that the present invention is not limited to the architecture of system 500. For example, any suitable processor-based device may be utilized for implementing software development tool 12, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   causing, by an authoring tool executed by a processor, at least one original source file to be modified to generate at least one browser source code file, wherein generating the at least one browser source code file comprises processing the at least one original source file to provide an output presentation;
   providing, in an interface of the authoring tool, a run-time view comprising the output presentation, wherein the output presentation comprises at least one interface component configured to perform a run-time operation in response to input received by the output presentation in the interface of the authoring tool; and
   providing, by the authoring tool, authoring interaction in the run-time view, wherein the authoring interaction comprises modifying the browser source code file or the original source file in response to an authoring input received at the run-time view.

2. The method of claim 1 wherein providing the run-time view comprises:
   generating, via an embedded browser, the run-time view responsive to a request to the authoring tool for a live preview mode.

3. The method of claim 1 wherein the providing authoring interaction comprises:
   responsive to a selection of a portion of a run-time output presentation page of the output presentation presented in the run-time view, providing a run-time source code view comprising an interface for modifying source code from the at least one browser source code file corresponding to the selected portion.

4. The method of claim 1 wherein the providing authoring interaction comprises:
   responsive to a selection of a portion of a run-time output presentation page of the output presentation presented in the run-time view, providing a design-time source code view comprising an interface for modifying source code from the at least one original source file.

5. The method of claim 1 wherein the providing authoring interaction comprises:
   responsive to a selection of a portion of run-time code from the at least one browser source code file presented in a run-time code view, providing a design-time source code view comprising an interface for modifying source code from the at least one original source file.

6. The method of claim 1 wherein the providing authoring interaction comprises:
   responsive to a selection of a portion of at least one of run-time code from the at least one browser source code file presented in a run-time code view and run-time output presentation page of the output presentation presented in the run-time view, providing an additional interface comprising corresponding context-specific information of the selected portion.

7. The method of claim 1, wherein the providing authoring interaction comprises:
responsive to a selection of a portion of at least one of run-time code from the at least one browser source code file presented in a run-time code view and a run-time output presentation page of the output presentation presented in the run-time view, providing a list having a plurality source code destinations corresponding to the selected portion, wherein each of the plurality of source code destinations corresponds to source code of the at least one browser source code file or the at least one original source file.

8. The method of claim 7, further comprising:
responsive to a selection of one of the listed original source code destinations, providing the corresponding original source code destination in an editable design-time code view interface.

9. A non-transitory computer-readable medium storing instructions executable by a processor, the instructions comprising:
instructions for causing at least one original source file to be modified to at least one browser source code file, wherein generating the at least one browser source code file comprises processing the at least one original source file to provide an output presentation;
instructions for providing a run-time view in an interface of an authoring tool, the run-time view comprising the output presentation, wherein the output presentation comprises at least one interface component configured to perform a run-time operation in response to input received by the output presentation in the interface of the authoring tool:
instructions for providing authoring tool, authoring interaction in the run-time view, wherein the authoring interaction comprises modifying the at least one browser source code file or the at least one original source file in response to an authoring input received at the run-time view.

10. The non-transitory computer-readable medium of claim 9, wherein the authoring interaction comprises:
responsive to a selection of a portion of a run-time output presentation page of the output presentation presented in the run-time view, providing, in a design-time source code view, corresponding source code from the at least one original source file that, contributes to the selected portion, and
responsive to a selection of a portion of run-time from the at least one browser source code file presented in the runtime code view, providing, in the design-time source code view, corresponding source code from the at least one original source file that contributes to the selected portion.

11. The non-transitory computer-readable medium of claim 10, wherein the run-time output presentation page is generated by an embedded browser of the authoring tool as a result of processing browser source code from the at least one browser source code files.

12. The non-transitory computer-readable medium of claim 9, further comprising:
instructions for responding to an input to the interface of the authoring tool in which the output presentation is provided by ceasing execution of dynamic code providing at least one function executable in response to the input received to the output presentation.

13. The non-transitory computer-readable medium of claim 12, wherein ceasing execution of dynamic code comprises ceasing execution of JavaScript code.

14. The non-transitory computer-readable medium of claim 9, further comprising:
instructions for receiving a selection of a portion of at least one of run-time code from the at least one browser source code file presented in the run-time code view and run-time output presentation page of the output presentation presented in the run-time view; and
instructions for responding to the selection of the portion by providing, in an additional interface, a list of original source code destinations that associated with the selected portion.

15. The non-transitory computer-readable medium of claim 14 further comprising:
instructions for responding to selection of one of the listed original source code destinations by providing the corresponding original source code destination in an editable design-time code view interface.

16. A system comprising:
a computer-readable medium to which instructions comprising an authoring tool are stored; and
a processor configured to execute said instructions that when executed by the processor causes the processor to:
cause at least one original source file to be modified to generate at least one browser source code file, wherein generating the at least one browser source code file comprises processing the at least one original source file to provide an output presentation;
provide a run-time view in an interface, the run-time view comprising the output presentation, wherein the output presentation comprises at least one interface component configured to perform a run-time operation in response to input received by the output presentation in the interface of the authoring tool,
provide authoring interaction in the run-time view, wherein the authoring interaction comprises modifying the at least one browser source code file or the at least one original source file in response to an authoring input received at the run-time view.

17. The system of claim 16, wherein run-time view comprises an output presentation page of the output presentation.

18. The system of claim 17, wherein the run-time view is editable such that edits made within the run-time view are applied to the source code of the at least one original source file.

19. The system of claim 16, wherein the instructions further comprise instructions that, when executed by the processor, cause the processor to:
responsive to a selection of a portion of a run-time output presentation page of the output presentation presented in the run-time view, provide a run-time source code view for presenting corresponding browser source code that contributes to the selected portion.

20. The system of claim 16, wherein the instructions further comprise instructions that, when executed by the processor, cause the processor to:
responsive to a selection of a portion of a run-time output presentation page of the output presentation presented in the run-time view, provide a design-time source code view for presenting corresponding original source code that contributes to the selected portion.

21. The system of claim 16, wherein the instructions further comprise instructions that, when executed by the processor, cause the processor to:
responsive to a selection of a portion of run-time code from the at least one browser source code file presented in the run-time code view, provide a design-time source code view for presenting corresponding original source code that contributes to the selected portion.

22. The system of claim 16, wherein the instructions further comprise instructions that, when executed by the processor, cause the processor to:
responsive to an input to the interface in which the output presentation is presented, ceasing execution of JavaScript code in the run-time page.

23. The system of claim 16, wherein the instructions further comprise instructions that, when executed by the processor, cause the processor to:
responsive to a selection of a portion of at least one of run-time code from the at least one browser source code file presented in the run-time code view and run-time output presentation page of the output presentation presented in the run-time view, providing in an additional interface a list of original source code destinations that are relevant to the selected portion.

24. The system of claim 23, wherein the instructions further comprise instructions that, when executed by the processor, cause the processor to:
responsive to a selection of one of the listed original source code destinations, providing the corresponding original source code destination to the in the design-time code view.

25. The method of claim 1, wherein causing the at least one original source file to be modified comprises the authoring tool performing modifications associated with delivery of the at least one original source file from a web server to a client and processing performed by the client to generate an output presentation.

26. The method of claim 1, wherein causing at least one original source file to be modified comprises downloading the at least one original source file from a web server, wherein the processing comprises processing performed by the web server to deliver at least one original source file to a client.

27. The method of claim 1, wherein causing the at least one original source file to be modified comprises modifying the at least one original source file to reflect processing performed by a client to generate an output presentation.

28. The method of claim 27, wherein processing performed by the client comprises adding event information from an external source to at least one of the one or more the browser source code files.

29. The method of claim 1, wherein the processing of the at least one original source code file comprises executing at least one scripting operation providing the run-time operation and generating code for the at least one browser source code file for configuring the at least one interface component to perform the run-time operation.

30. The method of claim 1, further comprising:
receiving the input to the at least one interface component;
performing the run-time operation in response to receiving the input;
modifying the at least one browser source code file based on performing the run-time operation; and
displaying the at least one browser source code file as modified in an additional interface of the authoring tool.

\* \* \* \* \*